(12) United States Patent
Yang et al.

(10) Patent No.: US 11,042,565 B2
(45) Date of Patent: Jun. 22, 2021

(54) ELECTRONIC DEVICE AND CONTAINER-BASED DATA MANAGEMENT METHOD BY ELECTRONIC DEVICE

(71) Applicant: Samsung Electronics Co., Ltd., Gyeonggi-do (KR)

(72) Inventors: Yong-Hyun Yang, Gyeonggi-do (KR); Moo-Chang Kim, Gyeonggi-do (KR); Tae-Jun Park, Gyeonggi-do (KR); Geon-Soo Kim, Gyeonggi-do (KR); Min-Kyung Hwang, Seoul (KR)

(73) Assignee: Samsung Electronics Co., Ltd

( * ) Notice: Subject to any disclaimer, the term of this patent is extended or adjusted under 35 U.S.C. 154(b) by 1067 days.

(21) Appl. No.: 15/407,717

(22) Filed: Jan. 17, 2017

(65) Prior Publication Data

US 2017/0206259 A1    Jul. 20, 2017

(30) Foreign Application Priority Data

Jan. 14, 2016 (KR) .................. 10-2016-0004846

(51) Int. Cl.
*G06F 16/00* (2019.01)
*G06F 16/27* (2019.01)
(Continued)

(52) U.S. Cl.
CPC ............ *G06F 16/27* (2019.01); *G06F 3/0604* (2013.01); *G06F 3/065* (2013.01); *G06F 3/067* (2013.01); *G06F 3/0644* (2013.01); *G06F 3/0652* (2013.01); *G06F 16/25* (2019.01); *G06F 21/31* (2013.01); *G06F 21/62* (2013.01); *H04L 67/1095* (2013.01); *H04W 12/04* (2013.01); *H04W 12/086* (2021.01); *H04L 63/061* (2013.01); *H04L 63/102* (2013.01); *H04L 67/306* (2013.01); *H04W 12/06* (2013.01); *H04W 12/43* (2021.01); *H04W 88/02* (2013.01)

(58) Field of Classification Search
None
See application file for complete search history.

(56) References Cited

U.S. PATENT DOCUMENTS 9,467,529 B2 * 10/2016 Kikinis ................. H04H 60/27
2001/0047394 A1 * 11/2001 Kloba ..................... H04L 67/04
709/217

(Continued)

FOREIGN PATENT DOCUMENTS

KR        101485787        1/2015

*Primary Examiner* — Bai D Vu
(74) *Attorney, Agent, or Firm* — The Farrell Law Firm, P.C.

(57) ABSTRACT

Disclosed are electronic devices and methods for managing container-based data by the electronic devices, by generating a first container storing first personalized information, when a communication connection with a first external electronic device is established, transmitting the first personalized information so that it is stored in a second container of the first external electronic device, receiving second personalized information and storing the second personalized information in the first container, and when a communication connection with a second external electronic device is established, transmitting the second personalized information so that it is stored in a third container of the second external electronic device.

14 Claims, 16 Drawing Sheets

(51) Int. Cl.
  *G06F 3/06*      (2006.01)
  *G06F 21/31*     (2013.01)
  *G06F 16/25*     (2019.01)
  *H04W 12/04*     (2021.01)
  *H04L 29/08*     (2006.01)
  *G06F 21/62*     (2013.01)
  *H04W 12/086*    (2021.01)
  *H04W 12/06*     (2021.01)
  *H04W 88/02*     (2009.01)
  *H04L 29/06*     (2006.01)
  *H04W 12/43*     (2021.01)

(56) References Cited

U.S. PATENT DOCUMENTS

| | | | |
|---|---|---|---|
| 2009/0070695 | A1 | 3/2009 | Oh et al. |
| 2011/0310408 | A1* | 12/2011 | Saito .................. H04N 1/00222 |
| | | | 358/1.9 |
| 2012/0295601 | A1* | 11/2012 | Lang .................. H04L 12/1818 |
| | | | 455/415 |
| 2014/0006483 | A1* | 1/2014 | Garmark ............. H04L 65/4092 |
| | | | 709/203 |
| 2014/0006947 | A1* | 1/2014 | Garmark ............. H04L 65/4084 |
| | | | 715/716 |
| 2015/0288649 | A1* | 10/2015 | Kim ........................ H04W 4/16 |
| | | | 455/414.1 |
| 2016/0135014 | A1* | 5/2016 | Alharayeri ............... H04L 67/28 |
| | | | 455/456.3 |
| 2016/0302120 | A1* | 10/2016 | Draznin ................ H04W 36/12 |
| 2016/0358180 | A1* | 12/2016 | Van Os ............... G07F 17/0035 |
| 2018/0357403 | A1* | 12/2018 | Shnurenko .......... H04L 63/0815 |

\* cited by examiner

| Lv 1 | Lv 2 | Lv 3 | Lv 4 |
|---|---|---|---|
| Container info<br>- Type<br>- Version<br>- Privilege<br>- Account info<br><br>Authentication info<br>- Account, ID/password<br>- Pairing key | Environmnt info<br>- System setting data<br>- Application setting data<br>- Application list<br>- Application data | Secured/Private info<br>- Secured user data<br>- User privacy data<br>- User statistic data | User info<br>- Multimedia data<br>- User data<br>- Shared data |
| ~ 1 Mbytes | ~ 10 Mbytes | 50 Mbytes ~ | 100 Mbytes ~ |

FIG.14

ELECTRONIC DEVICE AND CONTAINER-BASED DATA MANAGEMENT METHOD BY ELECTRONIC DEVICE

PRIORITY

This application claims priority under 35 U.S.C. § 119(a) to a Korean Patent Application filed in the Korean Intellectual Property Office on Jan. 14, 2016 and assigned Serial No. 10-2016-0004846, the contents of which are incorporated herein by reference.

BACKGROUND

1. Field of the Disclosure

The present disclosure relates generally to electronic devices, and more particularly, to container-based data management methods by the electronic devices.

2. Description of the Related Art

Various types of smart devices based on conventional mobile operating systems are being developed. Examples of such devices include smart watches, bands, Google Glass™, and virtual reality wearable devices, which require elevated inter-device data sharing, security, and analysis for users transporting multiple electronic devices. Wearable devices are becoming must-have items for individuals, as are other mobile devices.

A wearable device may be driven in such a manner as to interwork with an electronic device to receive information. A wearable device may perform a series of tasks including setting the user's existing mobile environment and storing personal data for a newly purchased device.

When the user uses another person's device, however, others may be exposed to the user's personal data from the wearable devices. Furthermore, user experience data stored in the wearable devices may be lost unless a separate process is performed.

As such, there is a need in the art for a method and apparatus enabling the user's data to be managed in a manner that prevents unwanted exposure of such data to others.

SUMMARY

An aspect of the present disclosure is to address at least the above-mentioned problems and/or disadvantages and to provide at least the advantages described below.

According to an aspect of the present disclosure, there is provided an electronic device and method for sharing and managing personalized information based on containers by the electronic device.

In accordance with an aspect of the present disclosure, an electronic device includes a housing, at least one contact connected with the housing, the at least one contact configured to be coupled to a user's body or an object, at least one communication circuit, a user interface exposed at least partially through the housing, a processor in the housing, the housing electrically connected with the communication circuit and the user interface, and a non-volatile storage device electrically connected with the processor and including a data container configured to store user- and/or account-based items, wherein the storage device stores instructions which, when executed, enable the processor to establish a first communication link with a first external electronic device including a first application program supporting the first communication link using the communication circuit, at least partially sync with the first external electronic device for at least one of the user-based and account-based items using the communication circuit, disconnect the electronic device from the first external electronic device while maintaining the at least one of the user-based and account-based items and information on data in the container, establish a second communication link with a second external electronic device including a second application supporting the second communication link using the communication circuit when the at least one of the user-based and account-based items and the information on the data is not provided, and partially sync with the second external electronic device for at least one of the user-based and account-based items using the communication circuit.

In accordance with another aspect of the present disclosure, an electronic device includes a memory including a first container storing first personalized information generated based on at least one of a user and an account and a processor that establishes a communication connection with a first external electronic device, transmits the first personalized information so that the first personalized information is stored in a second container of the first external electronic device, receives second personalized information generated by the first external electronic device based on the at least one of the user and the account and stores the second personalized information in the first container, and when a communication connection with a second external electronic device is established, transmits the second personalized information stored in the first container so that the second personalized information stored in the first container is stored in a third container of the second external electronic device.

In accordance with another aspect of the present disclosure, a method for managing data by an electronic device including a housing, at least one contact connected with the housing, the at least one contact configured to be coupled to a user's body or an object, at least one communication circuit, a user interface exposed at least partially through the housing, a processor in the housing, the housing electrically connected with the communication circuit and the user interface, and a non-volatile storage device electrically connected with the processor, the method enabling the processor of the electronic device to establish a first communication link with a first external electronic device including a first application program supporting the first communication link using the communication circuit, at least partially sync with the first external electronic device for at least one of user-based and account-based items using the communication circuit, disconnect the electronic device from the first external electronic device while maintaining the at least one of the user-based and account-based items and information on data in a container included in the storage device and storing data configured to store at least one of the user-based and account-based items, establish a second communication link with a second external electronic device including a second application supporting the second communication link using the communication circuit when the at least one of the user-based and account-based items and the information on the data is not provided, and partially sync with the second external electronic device for at least one of the user-based and account-based items using the communication circuit.

In accordance with another aspect of the present disclosure, a method for managing container-based information by an electronic device includes generating a first container storing first personalized information generated based on at least one of a user and an account, when a communication connection with a first external electronic device is established, transmitting the first personalized information so that the first personalized information is stored in a second container of the first external electronic device, receiving second personalized information generated by the first external electronic device based on the at least one of the user and the account and storing the second personalized information in the first container, and when a communication connection with a second external electronic device is established, transmitting the second personalized information stored in the first container so that the second personalized information stored in the first container is stored in a third container of the second external electronic device.

BRIEF DESCRIPTION OF THE DRAWINGS

The above and other aspects, features, and advantages of the present disclosure will become apparent to those skilled in the art from the following detailed description, which, taken in conjunction with the accompanying drawings, in which:

FIG. 14 illustrates a configuration of personalized information of an electronic device according to an embodiment of the present disclosure;

DETAILED DESCRIPTION OF EMBODIMENTS OF THE DISCLOSURE

Figure 1:
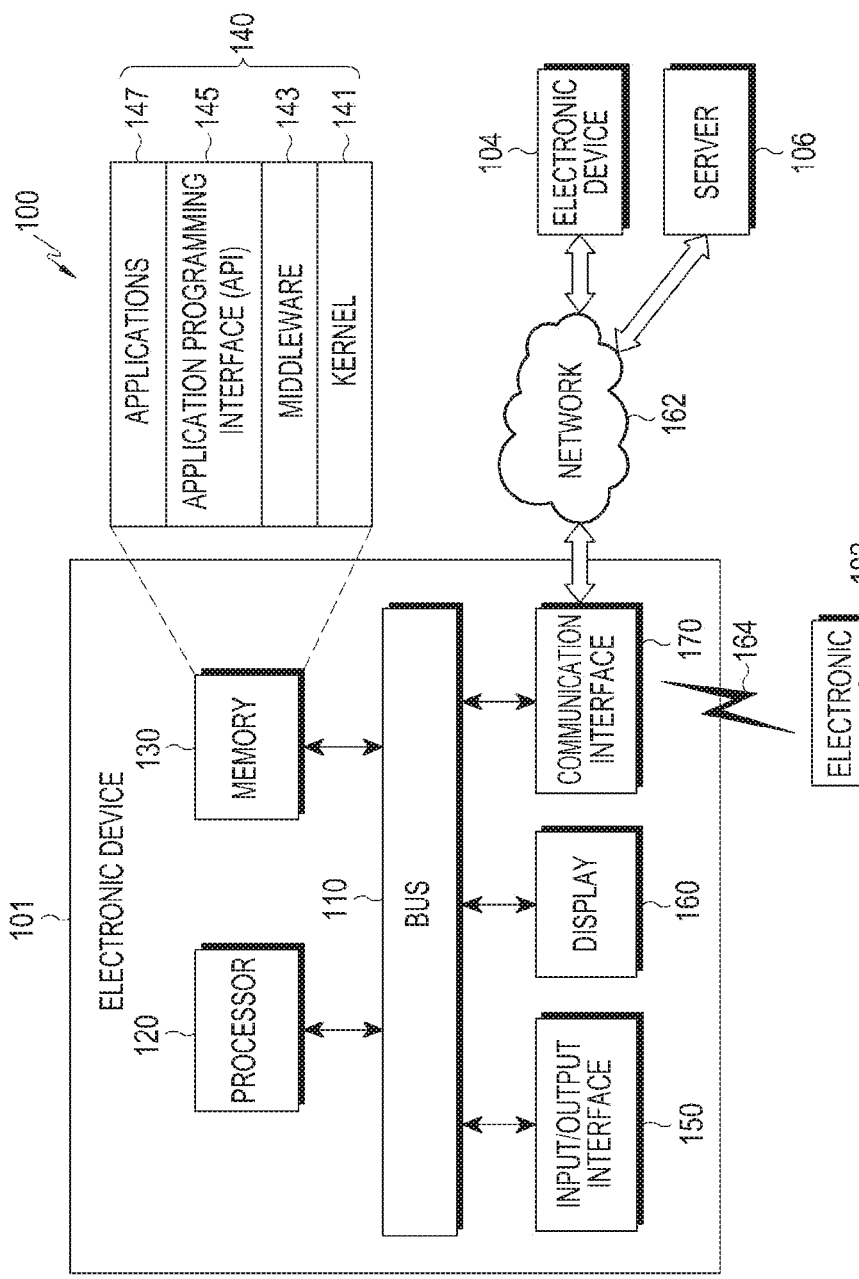
FIG. 1 illustrates a network configuration according to an embodiment of the present disclosure.

Embodiments of the present disclosure will now be described with reference to the accompanying drawings. However, it should be appreciated that the present disclosure is not limited to the embodiments, and all changes and/or equivalents or replacements thereto also pertain to the scope of the present disclosure. The same or similar reference denotations may be used to refer to the same or similar elements throughout the specification and the drawings, and like reference numerals will be understood to refer to like parts, components, and structures.

As used herein, the expressions "have," "may have," "include," or "may include" a feature, such as a number, function, operation, or a component, indicate the existence of the feature and do not exclude the existence of other features.

As used herein, the expressions "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, and (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. A first component may be referred to as a second component, and vice versa without departing from the scope of the present disclosure.

It will be understood that when an element, such as a first element, is referred to as being operatively or communicatively "coupled with/to," or "connected with/to" another element, such as a second element, the first element can be coupled or connected with/to the second element directly or via a third element. In contrast, it will be understood that when a first element is referred to as being "directly coupled with/to" or "directly connected with/to" a second element, no third element intervenes between the first and second elements.

As used herein, the expression "configured (or set) to" may be interchangeably used with the expressions such as "suitable for," "having the capacity to," "designed to," "adapted to," "made to," or "capable of" depending on circumstances, and does not necessarily indicate "specifically designed in hardware to." Rather, "configured to" may indicate that a device can perform an operation together with another device or parts. For example, the term "processor configured (or set) to perform A, B, and C" may indicate a generic-purpose processor, such as a central processing unit (CPU) or application processor that may perform the operations by executing one or more software programs stored in a memory device or an embedded processor for performing the operations.

The terms as used herein are provided merely to describe some embodiments thereof, and not to limit the scope of other embodiments of the present disclosure. It is to be understood that the singular terms "a," "an," and "the" include plural references unless the context clearly dictates otherwise. The terms including technical and scientific terms used herein have the same meaning as commonly understood by one of ordinary skill in the art to which the embodiments of the present disclosure pertain. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the present disclosure.

For example, the electronic device according to embodiments of the present disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device. The wearable device may include at least one of an accessory-type device, such as a watch, a ring, a bracelet, an anklet, a necklace, glasses, contact lenses, or a head-mounted device (HMD), a fabric- or clothes-integrated device, such as electronic clothes, a body attaching-type device, such as a skin pad or tattoo, or a body implantable device, such as an implantable circuit.

According to an embodiment of the present disclosure, the electronic device may be a home appliance including at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box, such as Samsung HomeSync™, Apple TV™, or Google TV™, a gaming console (Xbox™, PlayStation™, an electronic dictionary, an electronic key, a camcorder, or an electronic picture frame.

According to an embodiment of the present disclosure, examples of the electronic device may include at least one of various medical devices, such as a blood sugar measuring device, a heartbeat measuring device, or a body temperature measuring device, a magnetic resource angiography (MRA) device, a magnetic resource imaging (MRI) device, a computed tomography (CT) device, an imaging device, or an ultrasonic device, a navigation device, a global navigation satellite system (GNSS) receiver, an event data recorder (EDR), a flight data recorder (FDR), an automotive infotainment device, a sailing electronic device, such as a sailing navigation device or a gyro compass, avionics, security devices, vehicular head units, industrial or home robots, automated teller machines (ATMs), point of sales (POS) devices, or Internet of Things (IoT) devices, such as a light bulb, various sensors, an electric or gas meter, a sprinkler, a fire alarm, a thermostat, a street light, a toaster, fitness equipment, a hot water tank, a heater, or a boiler.

According to embodiments of the present disclosure, examples of the electronic device may be at least one of part of a piece of furniture or building/structure, an electronic board, an electronic signature receiving device, a projector, or measurement devices such as for measuring water, electricity, gas, or electromagnetic waves. The electronic device may be one or a combination of the above-listed devices, and may be a flexible electronic device. The electronic device disclosed herein is not limited to the above-listed devices, and may include new electronic devices depending on the development of technology.

Hereinafter, electronic devices are described with reference to the accompanying drawings, according to embodiments of the present disclosure. As used herein, the term "user" may denote a human or a device, such as an artificial intelligence electronic device using the electronic device.

According to embodiments of the present disclosure, an electronic device may manage container-based data by copying, generating, or moving user- and/or account-based personalized information to another external electronic device, enabling seamless use in the user's unique environment even when the user uses his new device or another person's electronic device.

FIG. 1 illustrates a network configuration according to an embodiment of the present disclosure.

Referring to FIG. 1, an electronic device 101 is included in a network environment 100 and may include a bus 110, a processor 120, a memory 130, an input/output interface 150, a display 160, and a communication interface 170. In some embodiments, the electronic device 101 may exclude at least one of the components or may add other components.

The bus 110 may include a circuit for connecting the components 120 to 170 with one another and transferring communications between the components.

The processor 120 may include one or more of a CPU, an application processor (AP), and a communication processor (CP). The processor 120 may perform control on at least one of the other components of the electronic device 101, and/or perform an operation or data processing relating to communication.

The memory 130 may include a volatile and/or non-volatile memory. For example, the memory 130 may store commands or data related to at least one other component of the electronic device 101, and may store software and/or a program 140 including a kernel 141, middleware 143, an application programming interface (API) 145, and/or applications 147. At least a portion of the kernel 141, middleware 143, or API 145 may be denoted as an operating system (OS).

For example, the kernel 141 may control or manage system resources, such as the bus 110, processor 120, or a memory 130, used to perform operations or functions implemented in other programs, such as the middleware 143, API 145, or application program 147. The kernel 141 may provide an interface that enables the middleware 143, the API 145, or the application 147 to access the individual components of the electronic device 101 to control or manage the system resources.

The middleware 143 may function as a relay to enable the API 145 or the application 147 to communicate data with the kernel 141, for example.

The middleware 143 may process one or more task requests received from the applications 147 in order of priority. For example, the middleware 143 may assign at least one of application programs 147 with priority of using system resources (e.g., the bus 110, processor 120, or memory 130) of at least one electronic device 101, and may perform scheduling or load balancing on the one or more task requests by processing the one or more task requests according to the priority assigned to the at least one applications 147.

The API 145 enables the applications 147 to control functions provided from the kernel 141 or the middleware 143. For example, the API 133 may include at least one interface or function, such as a command for filing control, window control, image processing or text control.

The input/output interface 150 may transfer commands or data input from a user or other external devices to other component(s) of the electronic device 101. The input/output interface 150 may output commands or data received from other component(s) of the electronic device 101 to the user or the other external device.

The display 160 may include, e.g., a liquid crystal display (LCD), a light emitting diode (LED) display, an organic light emitting diode (OLED) display, a microelectromechanical systems (MEMS) display, or an electronic paper display. The display 160 may display various contents to the user, such as text, images, videos, icons, or symbols. The display 160 may include a touchscreen and may receive, e.g., a touch, gesture, proximity or hovering input using an electronic pen or a body portion of the user.

For example, the communication interface 170 may establish communication between the electronic device 101 and an external electronic device, such as a first electronic device 102, a second electronic device 104, or a server 106). The communication interface 170 may be connected with the network 162 through wireless or wired communication to communicate with the external electronic device.

The wireless communication may be a cellular communication protocol and may use at least one of long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). The wireless communication may include short-range communication 164. The short-range communication 164 may include at least one of wireless fidelity (Wi-Fi), Bluetooth, near-field communication (NFC), zigbee, z-wave, or global navigation satellite system (GNSS) or (Glonass). The GNSS may include at least one of global positioning system (GPS), Beidou navigation satellite system (Beidou) or Galileo, or the European global satellite-based navigation system. Hereinafter, the terms "GPS" and the "GNSS" may be interchangeably used herein. The wired connection may include at least one of universal serial bus (USB), high definition multimedia interface (HDMI), recommended standard (RS)-232, or plain old telephone service (POTS). The network 162 may include at least one of communication networks, e.g., a computer network, such as local area network (LAN) or wide area network (WAN), Internet, or a telephone network.

The first and second external electronic devices 102 and 104 may be the same or a different type from the electronic device 101. According to an embodiment of the present disclosure, the server 106 may include a group of one or more servers. All or some of operations executed on the electronic device 101 may be executed on another or multiple other electronic devices (e.g., the electronic devices 102 and 104 or server 106). When the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

Figure 2:
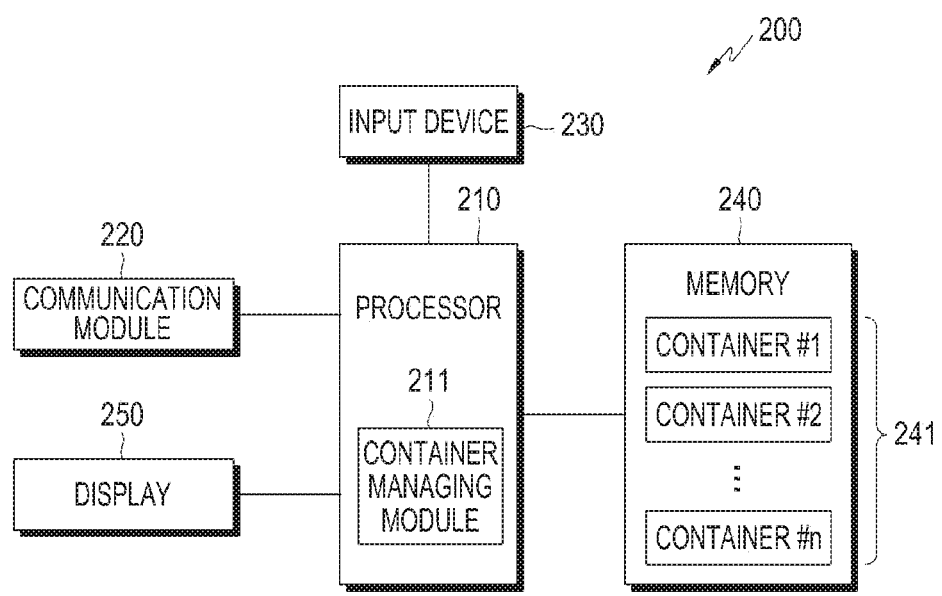
FIG. 2 illustrates a configuration of an electronic device according to an embodiment of the present disclosure.
Figure 3:
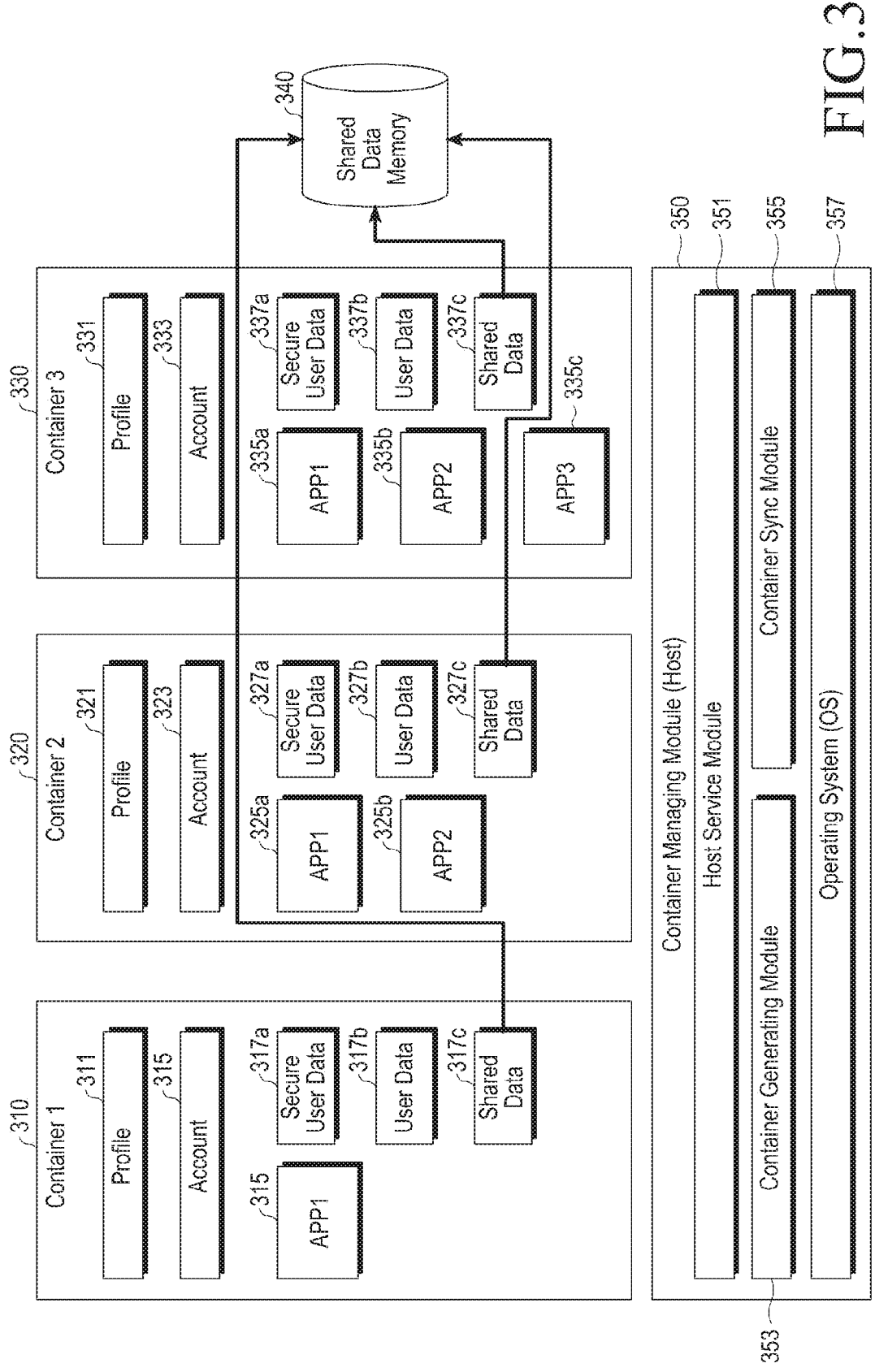
FIG. 3 illustrates a configuration of an electronic device according to an embodiment of the present disclosure.

FIGS. 2 and 3 illustrate configurations of an electronic device according to an embodiment of the present disclosure.

Referring to FIG. 2, the electronic device (e.g., the electronic device 101 of FIG. 1) may include at least one of a processor 210, a communication module 220, an input device 230, a memory 240, and a display 250.

According to an embodiment of the present disclosure, the processor 210 (e.g., the processor 120 of FIG. 1) may process information according to an operation of the electronic device or information according to execution of a program, an application, or a function, and may perform control to display the processed information on the display 250 or output the processed information through an audio module.

According to an embodiment of the present disclosure, the processor 210 may perform control to display various types of information (contents) on the entire screen or part of the screen of the display 250.

The processor 210 may perform a container service for sharing container-based personal data with another external electronic device (e.g., the electronic device 102 or 104 of FIG. 1). The processor 210, and may include a container managing module 211 performing the container service. The container managing module 211 is described below in detail with reference to FIG. 3.

According to an embodiment of the present disclosure, the processor 210 may generate and manage a container 241 based on the user's account or selection input and store the user's personalized information, such as personal data (P-data), in the generated container 241. The generated container 241 may be accessed by another user's electronic device or the user's external electronic device, or that may be synced for personal data. A specific configuration of the generated container 241 is described below.

The processor 210 may register the user's account to use the electronic device 200 and generate a default container corresponding to the registered account. The processor 210 may compare accounts registered upon establishing communication, such as by pairing with other electronic devices, and when paired with an electronic device with the same account, the electronic device 200 may be set as a host device, while the external electronic device paired with the electronic device 200 may be set as a client device. The host device and the client device may be synced with each other for their respective containers 241. When the accounts are different from each other, a container or P-data included therein may be copied or moved by the user's selection. In the default container, personal data stored based on container data level or category information managed by an account may be synced.

FIG. 3 illustrates a configuration of an electronic device according to an embodiment of the present disclosure.

Referring to FIG. 3, a container (e.g., the container 241 of FIG. 2) may be generated and managed by a container managing module 350 including a container host service (Daemon) module 351, a container generating module 353 such as a container customizing manager (CCM), a container sync module 355, such as a container sync manager (CSM), and an OS 357, such as a user device operating system (Kernel). Each container 310, 320, and 330 may independently be managed in a storage area of the memory 240 of FIG. 2. According to an embodiment of the present disclosure, shared data stored in each container 310, 320, and 330 may be stored and shared in a separate shared data memory 340.

The container host service module 351 may be a container service as per a container scheme supported per platform. The container generating module 353 is a wrapper layer providing the same interface by the container host service module 351 regardless of platform types. The container sync module 355 is for syncing with another external electronic device or container server. The container sync module 355 may perform an account-based sync, and when the terminal interworks on the account or completes a device pairing through a connectivity, such as a Bluetooth (BT) or wireless fidelity (Wi-Fi) direct module, the container sync module 355 may perform container sync with the external electronic device. The container sync may include such functions as copying an entire container or portion of data, moving an entire container or portion of data, data sync, or deleting an entire container or portion of data.

The containers 310, 320, and 330 may include container information or a container profile 311, 321, and 331, account-related information 313, 323, and 333, an application 315, 325a, 325b, 335a, 335b, and 335c installed per container, personal security data or secure user data 317a, 327a, and 337a, user data 317b, 327b, and 337b, and shared data 317c, 327c, and 337c sharable among containers, respectively.

The container information 311, 321, and 331 may include at least one of a type, such as enterprise or a container installed by a mobile device management (MDM) or personal, such as by a typical user, environment information (info), such as a container version, a container service version, a platform version, or time modified last, setting information (setting), such as an available memory size, volume setting, widget, or home screen setting, a privilege, such as for accessing a corresponding container, accessing another container, accessing particular data or resource, category of an installable application, or an option to change password, a key, such as a container identity (ID), a container password, or a pairing key, or an account ID, such as for a corresponding container owner.

The account-related information may include at least one of a container owner's account information, a contact, a schedule, a memo, a bookmark, an application list, such as a list of applications purchased/installed by the user—the list of applications being used by the user is managed on an account per platform and per device profile, or a container data level (category), such as a sync range of container data. The personal security data may include at least one of security information or personal privacy data, such as a personal certificate or key data, which should be prevented from leakage. The personal security data area may store encrypted data and may be set to be data accessible through authentication to increase the security level of personal data stored. The personal data may include at least one of data and content used through each electronic device-independent application, or information stored in the memory. The information stored in the memory include at least one of individual information, a contact, photograph, bookmark, memo, or individual information stored in the memory.

Referring back to FIG. 2, according to an embodiment of the present disclosure, the processor 210 may set a privilege for the generated container and may permit access and management by another electronic device according to the set privilege. The privilege setting on the container may include setting a privilege for accessing the container, managing the container, and/or installing an application. The privilege for accessing the container may indicate a privilege set to permit access by another container of the electronic device 200 or other containers of another electronic device in connection, upon generating (including moving or copying) a new container. The privilege for managing the container may indicate a privilege set to permit copying, moving, syncing, or deleting an entire corresponding container or its component. The privilege for installing an application may set a category for an application installable on a corresponding container.

According to an embodiment of the present disclosure, when connected with a second external electronic device, the processor 210 may perform control to implant first shared information stored in the container 241 of the memory 240 into a container stored isolated in the second electronic device. When use of the information transmitted from the first external electronic device is done or connection with the first external electronic device is terminated, the processor 210 may access the container of the first external electronic device and retrieve the personalized information using the set privilege information. When the communication is complete, the processor 210 may request to delete user- and account-related personalized information remaining in at least one external electronic device. The request to delete may be made by directly sending, to the external electronic device, a request delete message generated by the processor 210 or may be made through a server after the communication connection is released.

According to an embodiment of the present disclosure, the processor 210 may perform control to set a password for the container 241 and store the set password in an isolated storage area corresponding to the container 241, and may perform authentication based on a password set when the external electronic device accesses at least one container 241 included in the memory 240.

According to an embodiment of the present disclosure, the processor 210 may generate P-data to represent the electronic device 200 separately from a time of communication connection, regardless of whether the electronic device 200 is a host or client. The processor 210 may automatically generate or update data included in a category (level) of personalized information at a time of generation or update as set, and may perform control to share with the client device by a protocol agreed-on between the client device and the host device after the communication connection.

The personalized information may be divided into personalized information applied to the electronic device and personalized information for another device which is to be implemented into another external electronic device. The personalized information may be created as a full set of personal data, and at the timing of delivery thereof, new personal data may be generated by the host device, or the full set of personal data may be copied and transmitted to the client device. The personalized information may be updated selectively by the client device to fit an applicable category (level) of the client. Unless previously generated, the personalized information may be generated by the host device to fit the corresponding category after identifying the setting of the applicable category of the client immediately after connecting communication with the client.

According to an embodiment of the present disclosure, the processor 210 may determine a category (level) of P-data to be synced as per the client's setting. The P-data may be a set of various data or may be differentiated depending on the depth of personalization and may be selected by the client's setting. The category (level) of P-data to be implanted or copied to the client may be determined depending on the setting.

The processor 210, which may be a hardware module or software module, such as an application program, may be a hardware component (function) or software component (program) including at least one of various sensors, a data measuring module, an input/output interface, a module for managing the state or environment of the electronic device, and a communication module as included in the electronic device.

The processor 210 may be at least a portion of the processor and may include a combination of one or more of hardware, software, or firmware. The processor 210 may lack at least some of the components or may include other components for performing an image processing operation in addition to the components.

According to an embodiment of the present disclosure, when implemented in hardware, the configuration of at least a portion of the processor 210 may include some of at least one processor including a central processing unit (CPU)/micro processing unit (MPU), a memory, such as a register and/or random access memory (RAM) where at least one piece of memory loading data is loaded, and a bus for inputting/outputting at least one piece of data to the processor and memory. When implemented as software, the processor 210 may include a predetermined program routine or program data that is loaded from a predetermined recording medium to a memory to perform a defined function on the electronic device and is processed by the processor.

According to an embodiment of the present disclosure, the communication module 220 (e.g., the communication interface 170 of FIG. 1) of the electronic device may perform communication with other electronic device or external electronic device (e.g., the electronic device 102 or 104 of FIG. 1) under the control of the processor 210. The communication module 220 may communicate data related to an operation run under the control of the controller 210 with an external device. The communication module 220 may connect to a network using wireless communication or wired communication via the communication interface or perform communication through an inter-device connection.

The wireless connection may be made by various radio communication protocols, including, but not limited to, wireless fidelity (Wi-Fi), bluetooth (BT), zigbee, z-wave, near field communication (NFC), GPS, or cellular communication protocols, such as LTE, LTE-advanced (LTE-A), code division multiple access (CDMA), wideband CDMA (WCDMA), universal mobile telecommunications service (UMTS), wireless broadband (WiBro) or global system for mobile communications (GSM). The wired communication may include at least one of, e.g., universal serial bus (USB), high definition multimedia interface (HDMI), recommended standard 232 (RS-232), plain old telephone service (POTS), universal asynchronous receiver transmitter (UART), inter-integrated circuit (I2C), serial peripheral interface (SPI), or controller area network (CAN). The communication module 220 may include all other types of communication schemes that are widely known or are to be developed in the future, in addition to the above-enumerated communication schemes.

According to an embodiment of the present disclosure, the input device 230 (e.g., the input/output interface 150 of FIG. 1) of the electronic device may transfer, to the processor 210, various information, such as number and character information entered from the user and signals entered in relation with setting various functions and controlling functions by the electronic device. The input device 230 may support a user input for running an application or module supporting a particular function and may include at least one of a key input means, such as a keyboard or keypad, a touch input means, such as a touch sensor or touchpad, a sound source input means, a camera, or various sensors, and the input unit 230 may include a gesture input means. The input device 230 may include all types of input means that are being currently in development or are to be developed in the future. The input device 230 may receive, from the user, information entered by the user through the touch panel of the display 250 or the camera and may transfer the received information to the processor 210.

The input device 230 may transfer, to the processor 210, information related to the user's gesture received through the camera or various sensors. The input device 230 may transfer, to the processor 210, as well as an input signal according to the selection of at least one object, such as a content displayed on the screen.

According to an embodiment of the present disclosure, the memory 240 (e.g., the memory 130 of FIG. 1) of the electronic device may temporarily store various data generated while the program runs, as well as a program necessary for a functional operation. The memory 240 may largely include a program area and a data area. The program area may store relevant information for driving the electronic device, such as an OS for booting up the electronic device. The data area may store data communicated and generated according to an embodiment of the present disclosure. The memory 240 may include at least one storage medium of a flash memory, a hard disk, a multimedia card, a micro-type memory, such as a secure digital (SD) or an extreme digital (xD) memory, a random access memory (RAM), or a read only memory (ROM). The memory 240 may include and store multiple containers 241 in an independent storage area.

According to an embodiment of the present disclosure, the display 250 (e.g., a partial configuration of the input/output interface 150 or display 160 of FIG. 1) of the electronic device may output information on a result of running an operation, such as at least one of text, image, or video, under the control of the processor 210.

The display 250 may display, on the screen, an input pad, such as a button, for entering at least one of various numbers, characters, or symbols on an input window, in various manners. The display 250 may display a screen of running a service according to the execution of various applications related to information communication. When implemented in the form of a touchscreen, the display 250 may correspond to the touchscreen of an input device, and when implemented together with the input device 230 in the form of a touchscreen, the display 250 may display various information generated according to the user's touch operation.

According to an embodiment of the present disclosure, the display 250 may include at least one of a liquid crystal display (LCD), a thin film transistor LCD (TFT-LCD), an organic light emitting diode (OLED) display, a light emitting diode (LED) display, an active matrix OLED (AMOLED) display, a flexible display, and a three-dimensional (3D) display. Some of the displays may be configured in a transparent type or light-transmissive type enabling the outside to be viewed therethrough, in the form of a transparent OLED (TOLED) display.

According to an embodiment of the present disclosure, the electronic device 200 may further include, in addition to the display 250, another display device, such as an expanded display device or flexible display device, or a display device of an external electronic device, such as at least one of an external electronic device, a wearable device, or an external terminal device, interworking with the electronic device 200.

According to an embodiment of the present disclosure, the electronic device 200 may further include an audio module (e.g., the input/output interface 150 of FIG. 1) which may output sounds and may include at least one of an audio codec, a microphone (MIC), a receiver, an earphone output (EAR_L) and a speaker.

According to an embodiment of the present disclosure, the electronic device 200 may further include a means for outputting vibrations or a scent.

Main components of the electronic device have been described above with reference to FIG. 2, according to an embodiment of the present disclosure. However, the components shown in FIG. 2 are not essential components, and the electronic device may be implemented with additional or fewer components than those shown. The position of the major components described above in connection with FIG. 2 may vary.

The following are aspects according to embodiments of the present disclosure, as described above.

An electronic device comprises a housing, at least one contact connected with the housing, the at least one contact configured to be coupled to a user's body or an object, at least one communication circuit, a user interface exposed at least partially through the housing, a processor in the housing, the housing electrically connected with the communication circuit and the user interface, and a non-volatile storage device electrically connected with the processor. The housing may be electrically connected with the communication circuit and the user interface. The storage device may include a data container configured to store user- and/or account-based items, and the storage device may store instructions executed by the processor.

The processor may establish a first communication link with a first external electronic device including a first application program supporting the first communication link using the communication circuit, at least partially sync with the first external electronic device for at least one of the user-based and account-based items using the communication circuit, disconnect the electronic device from the first external electronic device while maintaining the user- and/or account-based items and information on data in the container, establish a second communication link with a second external electronic device including a second application supporting the second communication link using the communication circuit when the at least one of the user-based and account-based items and the information on the data is not provided, and partially sync with the second external electronic device for at least one of the user-based and account-based items using the communication circuit.

At least one of the user-based and account-based items may include at least one user profile information item or account information item related to the user.

At least one of the user-based and account-based items may include a list of at least one installed application program by the electronic device, data related to the at least one installed application program, or a user interface setting implemented by the user to the electronic device.

The electronic device may include the processor and a memory including a first container storing first personalized information generated based on the user and/or account. The processor may establish a communication connection with a first external electronic device, transmit the first personalized information so that the first personalized information is stored in a second container of the first external electronic device, receive second personalized information generated by the first external electronic device based on the at least one of the user and the account and store the second personalized information in the first container, and when a communication connection with a second external electronic device is established, transmit the second personalized information stored in the first container so that the second personalized information stored in the first container is stored in a third container of the second external electronic device.

When the communication connection with the second external electronic device is established, the processor may transmit the first personalized information so that the first personalized information stored in the first container is stored in the third container.

Upon establishing a communication connection with a third external electronic device having a different account from the account registered in the electronic device, the processor may request the third external electronic device to generate a new container based on the at least one of the user and the account and transmit the second personalized information so that the second personalized information stored in the first container is stored in the new container.

When the communication connection with the first external electronic device is terminated, the processor may receive information updated in connection with the first personalized information from the first external electronic device and update the first personalized information stored in the first container based on the updated information received.

When the communication connection with the second external electronic device is terminated, the processor may receive information updated in connection with the second personalized information from the second external electronic device and update the second personalized information stored in the first container based on the updated information received.

When the communication connection is terminated, the first personalized information and the second personalized information stored in the third container may be removed from the second external electronic device.

The processor may perform authentication based on the account and a password set upon accessing the second container of the first external electronic device, and when there is additional authentication set by a user, the processor may perform the additional authentication.

Figure 4:
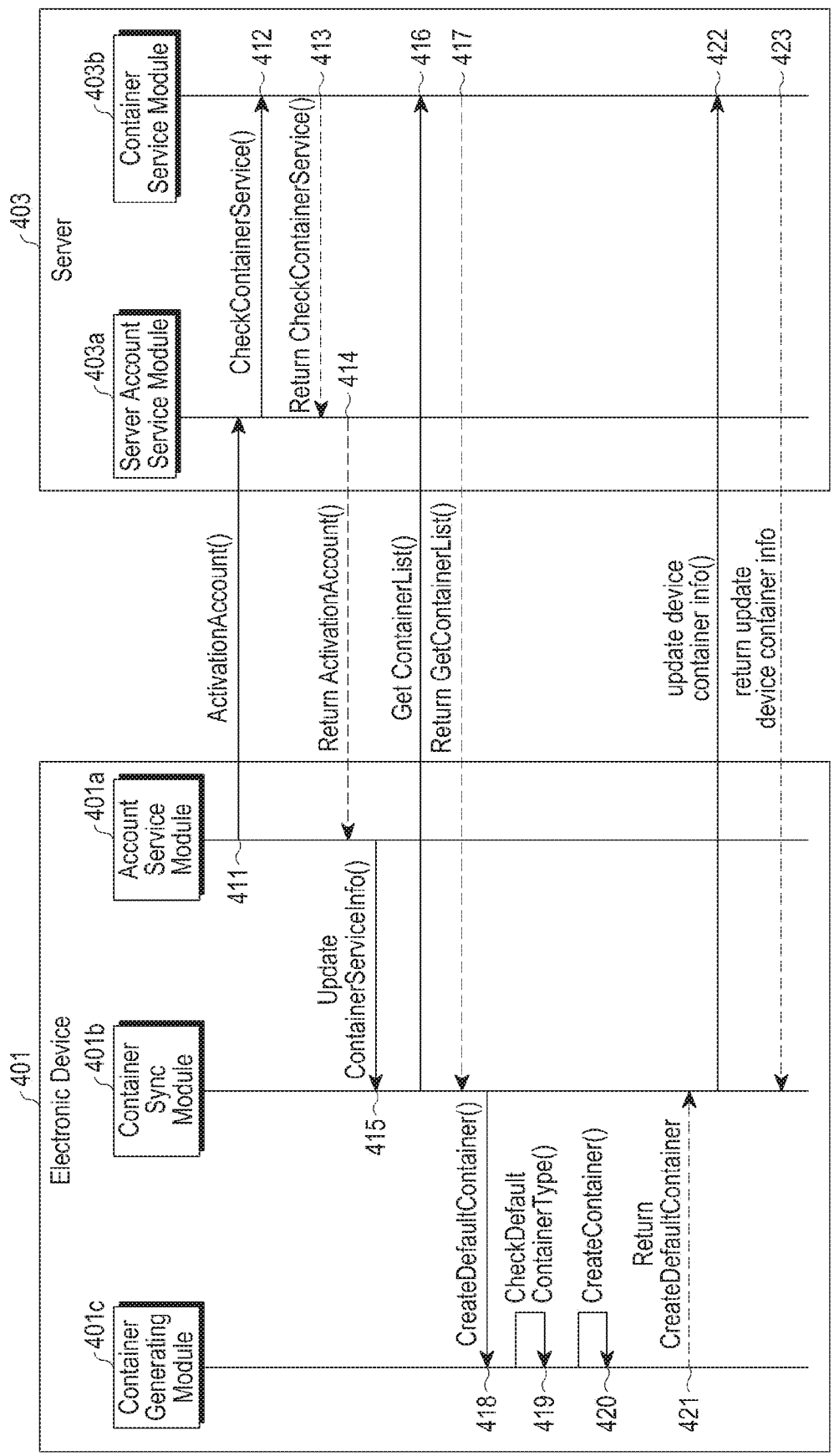
FIG. 4 illustrates a process of an electronic device according to an embodiment of the present disclosure.

FIG. 4 illustrates a process of an electronic device according to an embodiment of the present disclosure.

Referring to FIG. 4, the electronic device 401 (e.g., the electronic device 101 of FIG. 1 or the electronic device 200 of FIG. 2) may interwork with a server 403 to register an account for service and generate a container corresponding to the registered account.

In step 411, the account service module 401a of the electronic device 401 may send an 'activation account' message to request to register an account for container service to an account service module 403a of the server 403. In step 412, the account service module 403a of the server 403 may thus send container service confirmation message such as a 'check container service' to a container service module 403b. In step 413, the account service module 403a may receive a response message ('return check container service') including a result of checking the container service from the container service module 403b.

In step 414, the account service module 401a of the electronic device 401 may receive a 'return activation account' message including information about a result of registering the account from the account service module 403a of the server 403 in response to the account activation request.

In step 415, the account service module 401a of the electronic device 401 may send a message ('update container service info') for updating container service information to a container sync module 401b. In step 416, the account service module 401a may thus send a message ('get container list') for requesting a container list to the container service module 403b of the server 403a.

In step 417, the container sync module 401b of the electronic device 401 may receive a response message ('return get container list') including a container list for the requested container service from the container service module 403b of the server 403a in response to the container list request.

In step 418, the container sync module 401b may send a message ('create default container') requesting to generate a default container to a container generating module 401c. In step 419, the container generating module 401c may thus check the type of the default container. In step 420, the container generating module 401*c* may create the default container based on the container list received from the server 403.

In step 421, the container sync module 401*b* may receive a response message ('return create default container') responsive to the request to generate container from the container generating module 401*c*.

In step 422, the container sync module 401*b* may send a message ('update device container info') for updating information stored in the container.

In step 423, the container sync module 401*b* may receive a response message ('return update device container info') responsive to the message for updating information stored in the container from the server 403.

The electronic device may register an account and generate a default container by the operations of FIG. 4. The information stored in the default container may be synced among external electronic devices based on a container data level (category) as set. The information stored in the default container may include at least one of the container user's (owner's) account information, contact, schedule, memo, bookmark, or a list of applications purchased or installed by the user.

According to an embodiment of the present disclosure, when authentication is performed with an account registered as default upon syncing and accessing container and succeeds, the electronic device may permit the container sync or access.

According to an embodiment of the present disclosure, the electronic device may perform authentication for permitting the container sync and access through the registered account and an additional authentication scheme. Upon generating a container, the electronic device may arrange an additional authentication scheme for syncing or accessing the generated container and may previously register authentication information set by the additional authentication scheme selected by the user. The additional authentication scheme may include at least one of, e.g., a pattern, password, or bio authentication scheme.

According to an embodiment of the present disclosure, the electronic device may compare the registered account with the account of an external electronic device upon connecting communication with the external electronic device, and when the accounts are the same, the electronic device may enable itself to be set as a host device while setting the external electronic device as a client device and may sync between the host device and the client device. When the registered account differs from the account of the external electronic device, the electronic device may identify an available memory capacity and may copy or move the container to the container of the external electronic device based on a selected one of selectable levels according to the identified available memory capacity.

Figure 5:
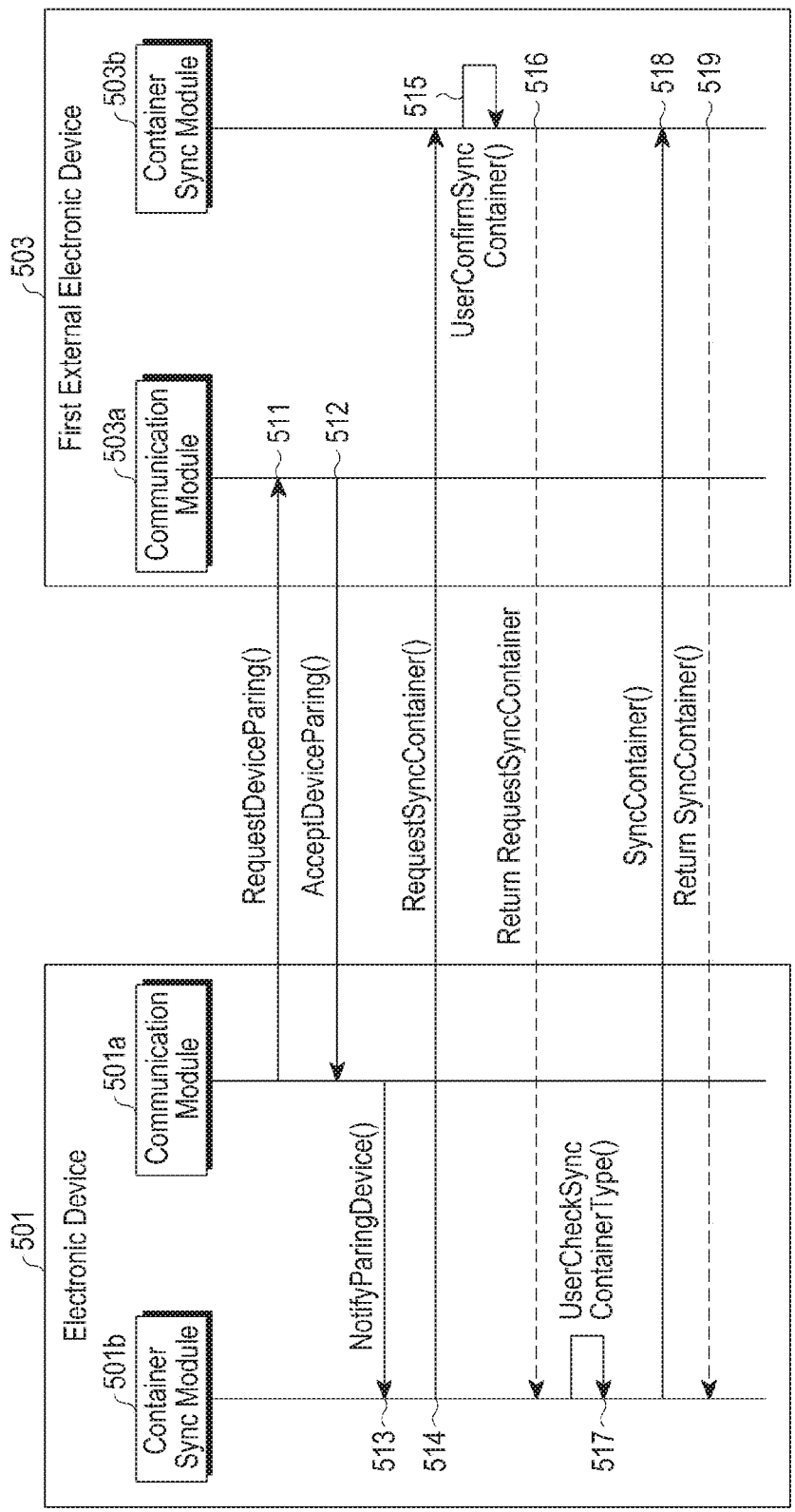
FIG. 5 illustrates a process of an electronic device according to an embodiment of the present disclosure.

FIG. 5 illustrates a process of an electronic device according to an embodiment of the present disclosure.

Referring to FIG. 5, in step 511, the electronic device 501 (e.g., the electronic device 101 of FIG. 1 or the electronic device 200 of FIG. 2) may send a pairing request message ('request device pairing') for connecting communication with a first external electronic device 503 (e.g., the electronic device 102 or 103 of FIG. 1) through the communication module 501*a* to the communication module 503*a* of the first external electronic device 503. In step 512, the electronic device 501 may receive a response message ('accept device pairing') to accept the communication connection request from the first external electronic device 503.

In step 513, the container sync module 501*b* of the electronic device 501 may receive a notification message ('notify pairing device') to indicate that communication with the first external electronic device 503 is connected from the communication module 501*a*.

In step 514, the container sync module 501*b* may send a request message ('request sync container') for syncing containers to the container sync module 503*b* of the first external electronic device 503. Thus, in step 515, the container sync module 503*b* of the first external electronic device 503 may perform user confirmation ('user confirm sync container') on syncing containers.

In step 516, the container sync module 501*b* of the electronic device 501 may send a response message ('return request sync container') responsive to the request for syncing containers from the container sync module 503*b*. In step 517, the container sync module 501*b* may receive a user confirmation ('user check sync container') on the type of a synced container.

In step 518, the container sync module 501*b* of the electronic device 501 may send a container sync message ('sync container') requesting to sync containers to the container sync module 503*b* of the first external electronic device 503. In step 519, the container sync module 501*b* may receive a response message ('return sync container') responsive to the request to sync containers.

By the container sync setting operations described above, the electronic device 501 and the external electronic device 503 may sync containers.

Figure 6:
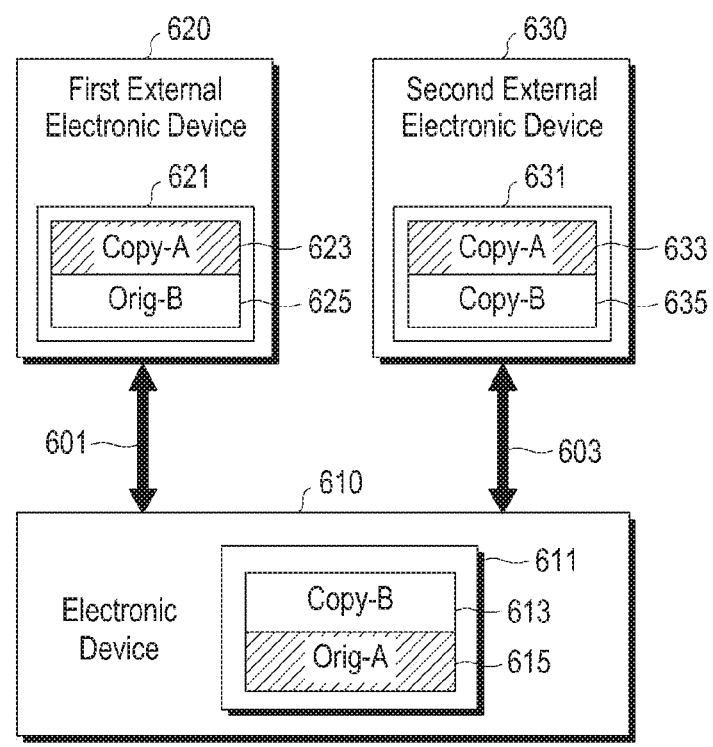
FIG. 6 illustrates a process of an electronic device according to an embodiment of the present disclosure.

FIG. 6 illustrates a process of an electronic device according to an embodiment of the present disclosure.

Referring to FIG. 6, in step 601, the electronic device 610 (e.g., the electronic device 101 of FIG. 1 or the electronic device 200 of FIG. 2) may perform communication connection with a first external electronic device 620 (e.g., the electronic device 102 or 104 of FIG. 1). As the communication connection is established, the electronic device 610 may be operated as the user's host device, and the first external electronic device 620 may be operated as the user's client device.

The electronic device may sync a first container 611 with a second container 621 of the first external electronic device 620 based on the user's account as in the operational process described above in connection with FIG. 5. In other words, the electronic device 610 and the first external electronic device 620 may share P-data that is information generated from the respective containers of the electronic device 610 and the first external electronic device 620. By so syncing, the electronic device 610 may store a copy (Copy-B) 613 of second personalized information (Orig-B) 625 generated in the second container 621 of the first external electronic device 620 into the first container 611. The electronic device 610 may store the generated first personalized information (Orig-A) 615 into the first container 611.

According to an embodiment of the present disclosure, the first external electronic device 620 may store a copy (Copy-A) 623 of the first personalized information (Orig-A) 615 generated in the first container 611 of the electronic device 610 into the second container 621, and may store the generated second personalized information (Orig-B) 625 into the second container 621.

Upon sensing access by an additional external electronic device having the same account as the user's account while in communication connection with the first external electronic device 620, the electronic device 610 may perform communication connection with the second external electronic device 630. Thus, the electronic device 610 may send a copy (Copy-B) 613 of the second personalized information to the second external electronic device 630 to be implanted into a third container 631 of the second external electronic device 630 at Copy-B 635.

The electronic device 610 may send the generated first personalized information (Orig-A) 615 to a third container 631 of the second external electronic device 630 to back up the generated first personalized information 615. Thus, the third container 631 of the second external electronic device 630 may store the copy 633 of the second personalized information, which is implanted with the copy 613 of the second personalized information stored in the first container 611, and the copy 635 of the first personalized information stored in the first container 611. Hence, the container 611 of the electronic device 610, the container 621 of the first external electronic device 620, and the container 631 of the second external electronic device 630 may synchronize their respective pieces of stored P-data.

As set forth above, the copy 613 or 635 of the first personalized information may be a copy of all or partial data of the generated first personalized information 615. According to an embodiment of the present disclosure, the copy 623 or 633 of the second personalized information may be a copy of all or partial data of the generated second personalized information 625.

According to an embodiment of the present disclosure as described above in connection with FIG. 6, when the user uses the second external electronic device 630, the second external electronic device 630 may provide the user with a container service through an application retained in the third container 621 accessible by the user. In such a case, the second external electronic device 630 may update, delete, or generate at least one data item of the personalized information 633 or 635 stored in the third container 621, corresponding to a user input.

Upon attempting to release the communication connection with the second external electronic device 630, the electronic device 610 may retrieve at least one of the copy 633 of the first personalized information or the copy 635 of the second personalized information that is implanted or backed up into the second external electronic device 630. The electronic device 610 may update the first personalized information 615 stored in the first container 611 based on the retrieved first personalized information 633, and may update the copy 613 of the second personalized information stored in the first container 611 based on the retrieved second personalized information 635.

Figure 7:
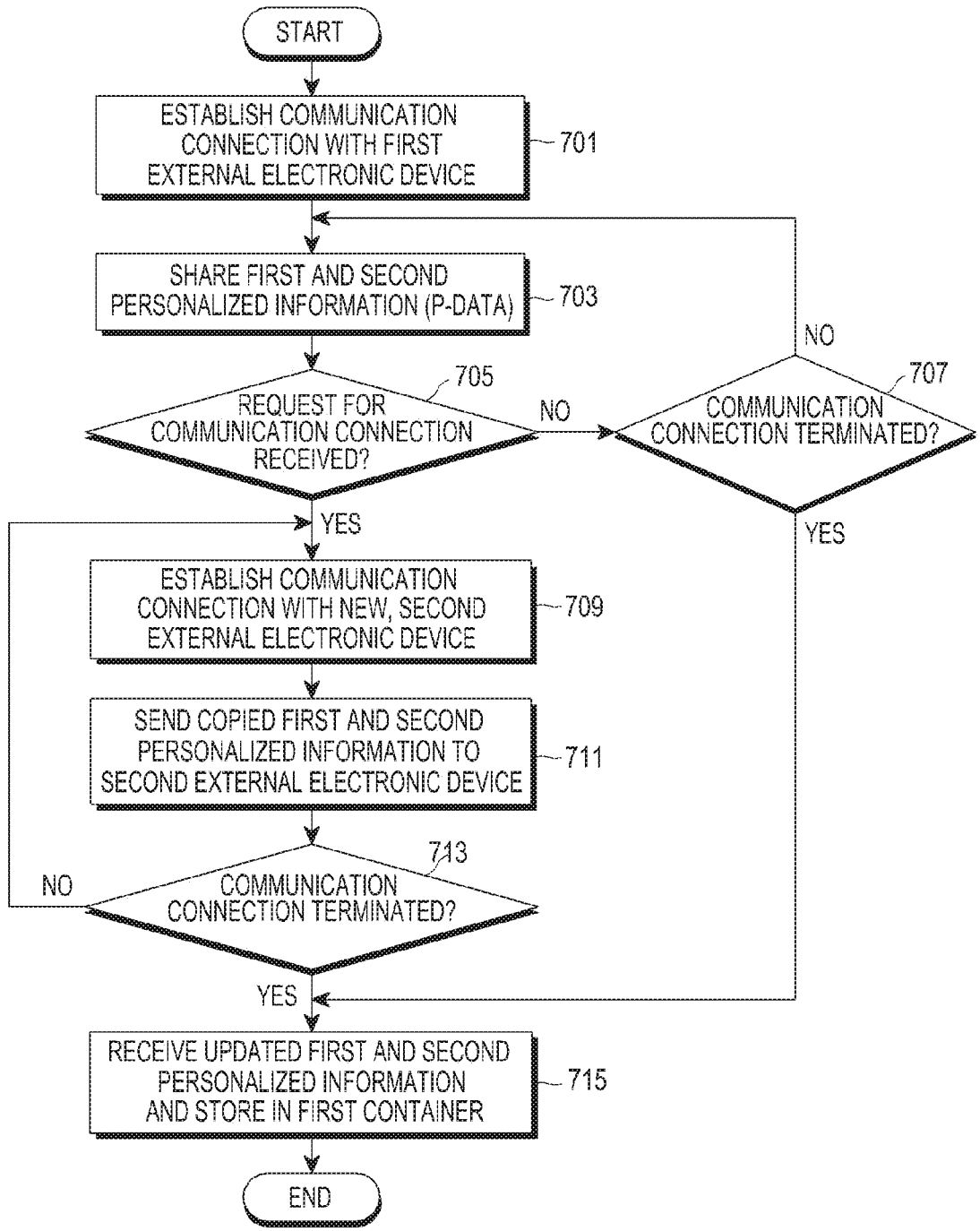
FIG. 7 illustrates a process of an electronic device according to an embodiment of the present disclosure.

FIG. 7 illustrates a process of an electronic device according to an embodiment of the present disclosure.

Referring to FIG. 7, the electronic device (e.g., the electronic device 101 of FIG. 1, the electronic device 200 of FIG. 2, or the electronic device 610 of FIG. 6) may connect communication with a first external electronic device (e.g., the electronic device 102 or 104 of FIG. 1 or the first external electronic device 620 of FIG. 6) in step 701. In step 703, as the communication connection is established between the electronic device and the first external electronic device, a sync may be conducted between a first container (e.g., the first container 611 of FIG. 6) generated in the electronic device and a second container (e.g., the second container 621 of FIG. 6) generated in the first external electronic device, and first and second personalized information stored in the containers may be shared.

In step 705, when the user attempts to use data stored in the first container using a new, second external electronic device (e.g., the second external electronic device 630 of FIG. 6), the electronic device may determine whether there is a request for connecting communication from the second external electronic device.

When the request for connecting communication from the second external electronic device is received, the electronic device performs step 709, and when not received, the electronic device may determine in step 707 whether communication connection with the first external electronic device is terminated. When determined in step 707 that the communication connection with the first external electronic device is terminated, the electronic device may perform step 715, and when the communication connection is determined not to be terminated, the electronic device may return to step 703.

In step 709, the electronic device may perform communication connection with the second external electronic device. In step 711, the electronic device may send the respective copies of first personalized information (e.g., the first personalized information 615 of FIG. 6) and second personalized information (e.g., the second personalized information 625) stored in the first container to the second external electronic device. Thus, the third container (e.g., the third container 631 of FIG. 6) of the second external electronic device may store the received copy of the first personalized information or second personalized information.

In step 713, the electronic device may determine whether communication connection with the second external electronic device is terminated. When it is determined that the communication connection is terminated, the electronic device may perform step 715, and when determining that the communication connection is not terminated, the electronic device may return to step 709.

In step 715, the electronic device may receive the copy of the first personalized information or second personalized information including data updated by implanting or backing up into the second external electronic device and may store the received copy of the first personalized information or second personalized information in the first container. Thus, the electronic device may update the personalized information (e.g., the first personalized information 615 or copy 615 of the second personalized information as shown in FIG. 6) stored in the first container based on the data updated in the first or second external electronic device.

Figure 8:
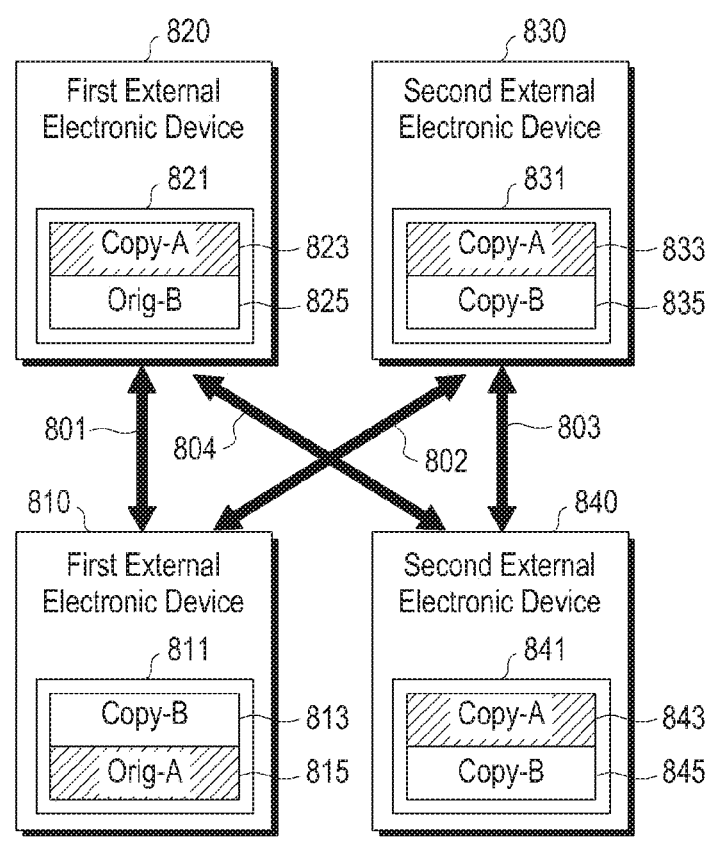
FIG. 8 illustrates a process of an electronic device according to an embodiment of the present disclosure.

FIG. 8 illustrates a process of an electronic device according to an embodiment of the present disclosure.

Referring to FIG. 8, in step 801, a first electronic device 810 (e.g., the electronic device 101 of FIG. 1 or the electronic device 200 of FIG. 2) may perform communication connection with a first external electronic device 820. As the communication connection is established, the first electronic device 810 may be operated as the user's first host device, and the first external electronic device 820 may be operated as the user's first client device.

The first electronic device 810 may sync a first container 811 with a second container 821 of the first external electronic device 820 based on the user's account. In other words, the first electronic device 810 and the second external electronic device 820, which are registered with the same account, may share pieces of P-data that they respectively generate. By so syncing, the first electronic device 810 may store a copy 813 (Copy-B) of second personalized information (Orig-B) 825 generated in the second container 821 of the first external electronic device 820 into the first container 811. The first electronic device 810 may store first personalized information (Orig-A) 815 generated by performing a service, application, or function into the first container 811.

According to an embodiment of the present disclosure, the first external electronic device 820 may store a copy (Copy-A) 823 of the first personalized information (Orig-A) 815 stored in the first container 811 and second personalized information generated by performing a service, application, or function into the second container 821.

In step 802, the first electronic device 810 may sense access by an additional external electronic device having the same account as the user account while in communication connection with the first external electronic device 820 or after the communication connection with the first external electronic device 820 is terminated. Upon sensing the additional external electronic device, e.g., a second external electronic device 830, the first electronic device 810 may perform communication connection with the second external electronic device 830. As the communication connection is established, the second external electronic device 830 may be operated as, e.g., the user's second client device. Thus, the first electronic device 810 may send a copy (Copy-B) 813 of the second personalized information to the second external electronic device 830 to be implanted into a third container 831 of the second external electronic device 830.

The first electronic device 810 may send the generated first personalized information (Orig-A) 815 to the second external electronic device 830 to back up the first personalized information 815 in the third container 831 of the second external electronic device 830. Thus, the third container 831 of the second external electronic device 830 may store the copy 833 of the first personalized information 815 and the copy 835 of the second personalized information 813 in the first container 811.

According to an embodiment of the present disclosure, when the user is currently using the second external electronic device 830, the second external electronic device 830 may provide the user with a container service through an application retained in the third container 831 accessible by the user. In such a case, the second external electronic device 830 may update, delete, or generate at least one data item of the first personalized information 833 or the second personalized information 835 stored in the third container 831, corresponding to a user input.

According to an embodiment of the present disclosure, upon attempting to release the communication connection with the second external electronic device 830, the first electronic device 810 may retrieve the copy 833 or 835 of personalized information implanted or backed up into the second external electronic device 830, may update the first personalized information 815 stored in the first container 811 based on the retrieved first personalized information 833, and may update the copy 813 of the second personalized information stored in the first container 811 based on the retrieved second personalized information 835.

In step 803, a new electronic device, e.g., a second electronic device 840, may connect communication with the second external electronic device 830. As the communication connection is established, the second electronic device 840 may be operated as the user's second host device. According to an embodiment of the present disclosure, when the communication connection between the first electronic device 810 and the first external electronic device 820 and the communication connection between the first electronic device 810 and the second external electronic device 830 are both released, the second electronic device 840 may store, in a fourth container 841, a re-copy 843 or 845 of the personalized information copy 833 or 835 stored in the third container 831 from the second external electronic device 830 to use the pieces of personalized information, which are in use, subsequent to the first electronic device 810.

In step 804, when a communication connection is established between the second electronic device 840 and the first external electronic device 820, the second electronic device 840 may sync the copy 843 or 845 of personalized information stored in the fourth container 841 with the copy 823 of the first personalized information or the second personalized information 825 stored in the second container 821 of the first external electronic device 820 and send the updated personalized information to the first external electronic device 820. The first external electronic device 820 may receive all or partial data of the personalized information updated in the second electronic device 840 to update the personalized information stored in the second container 821. The fourth container 841 may receive and store the personalized information copy 833 or 835 updated last in the second external electronic device 830 before the communication terminates.

Figure 9:
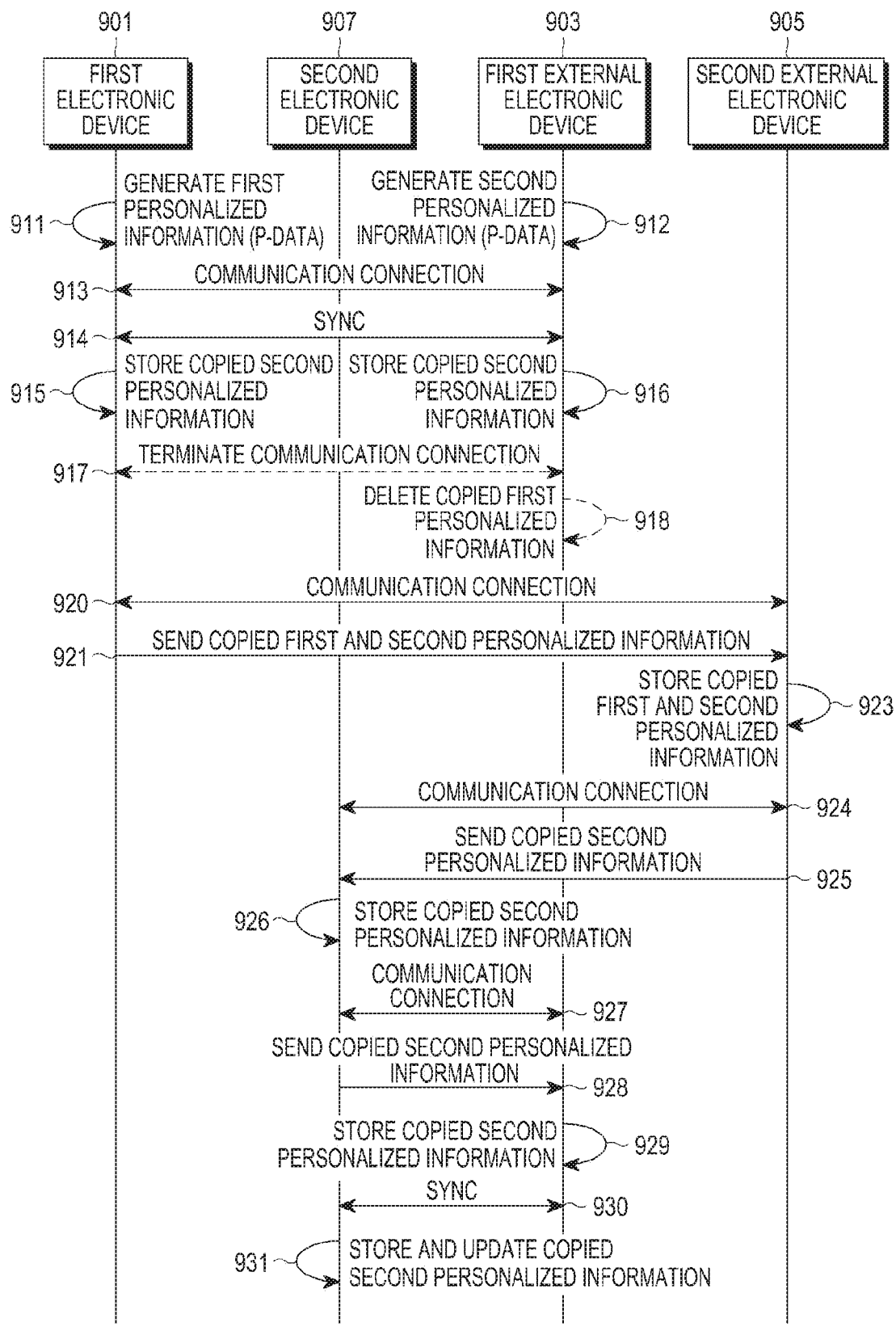
FIG. 9 illustrates a process of an electronic device according to an embodiment of the present disclosure.

FIG. 9 illustrates a process of an electronic device according to an embodiment of the present disclosure.

Referring to FIG. 9, in steps 911 and 912, a first electronic device 901 (e.g., the electronic device 810 of FIG. 8) and a first external electronic device 903 (e.g., the electronic device 820 of FIG. 8) each may register a user account, generate a default container, and generate P-data stored in the default container, as described above in connection with FIG. 5.

In step 913, the first electronic device 901 may perform communication connection with the first external electronic device 903.

In step 914, when a communication connection is established between the first electronic device 910 and the first external electronic device 903, the first electronic device 910 may sync a generated first container (e.g., the first container 811 of FIG. 8) with a second container (e.g., the second container 821 of FIG. 8) of the first external electronic device 903 to share the stored personalized information. Thus, in step 915, the first electronic device 901 may store the shared personalized information copied from the first external electronic device 903, in the first container. In step 916, the first external electronic device 903 may store personalized information copied from the first container of the first electronic device 901 into the second container.

In step 917, when the first electronic device 901 terminates the communication connection with the first external electronic device 903, the first electronic device 901 may perform an operation for releasing the communication connection. In step 918, the first external electronic device 903 may delete, from the second container, the personalized information copied from the first electronic device 901, in such a manner that the user sends a delete request to a server using account information through the first electronic device in use, and the server requests the first external electronic device 903 to delete the information requested by the user to do so. Thus, the first external electronic device 903 may delete the information requested to be deleted in the second container.

In step 920, the first electronic device 901 may perform communication connection with a second external electronic device 905. In step 921, the first electronic device 901 may send personalized information copied from the first container (e.g., the copy of second personalized information or the first personalized information 815 of FIG. 8) to the second external electronic device 905. In step 923, the second external electronic device 905 may thus store the copies of the personalized information copied in the third container.

In step 924, when the user attempts to currently use the second electronic device 907, the second electronic device 907 may perform communication connection with the second external electronic device 905 last used.

In step 925, the second electronic device 907 may receive the copy of the second personalized information stored in the container of the second external electronic device 905. In step 926, the second electronic device 907 may store the received copy of second personalized information in the third container of the second electronic device 907. Thus, the second electronic device 907 may receive and store the latest personalized information obtained by updating, in the second external electronic device 905, the personalized information generated in the first external electronic device 903.

In step 927, the second electronic device 907 may perform communication connection with the first external electronic device 903. In step 928, the second electronic device 907 may copy the second personalized information stored in its container and send the same to the first external electronic device 903. Thus, in step 929, the first external electronic device 903 may store a copy of the copied second personalized information in its container. The copy of the second personalized information is information obtained by updating personalized information, generated in the first external electronic device 903, in another device. Hence, the first external electronic device 903 may update the second personalized information currently stored, based on the received copy of the second personalized information.

In step 930, the second electronic device 907 may perform sync with the first external electronic device 903 currently in connection. In step 931, the second electronic device 907 may store a copy of the second personalized information copied from the first external electronic device 903.

Figure 10:
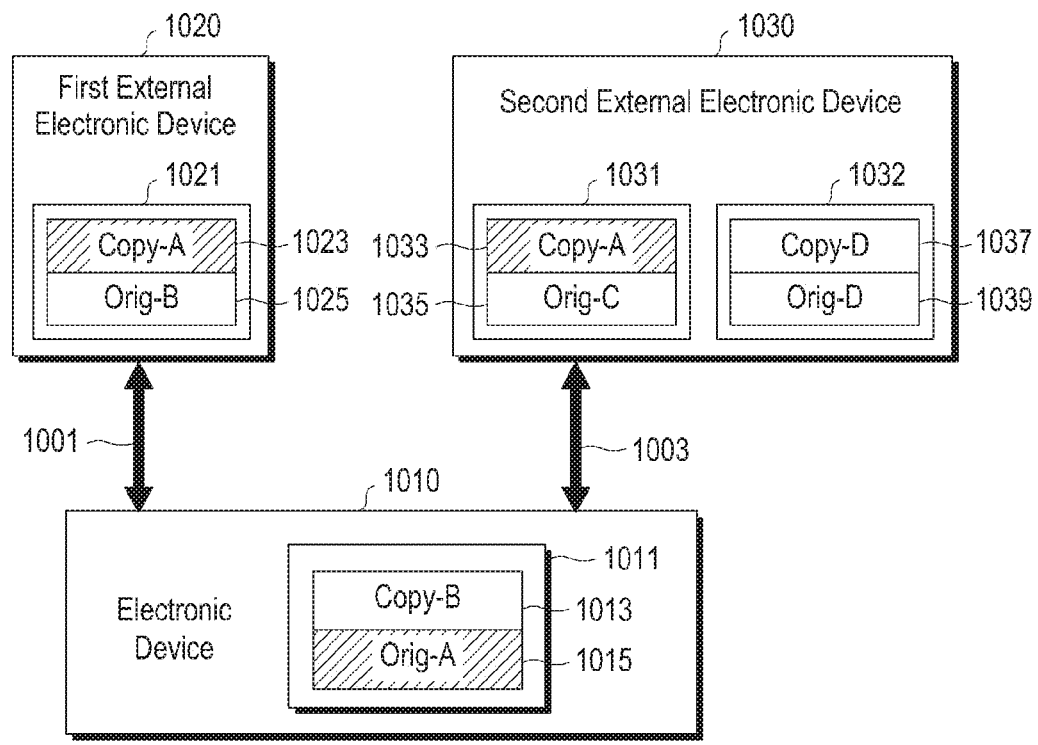
FIG. 10 illustrates a process of an electronic device according to an embodiment of the present disclosure.

FIG. 10 illustrates a process of an electronic device according to an embodiment of the present disclosure.

Referring to FIG. 10, in step 1001, an electronic device 1010 (e.g., the electronic device 101 of FIG. 1 or the electronic device 200 of FIG. 2) may perform communication connection with a first external electronic device 1020 and may sync a first container 1011 with a second container 1021 of the first external electronic device 1020. As the sync is performed, the electronic device 1010 and the first external electronic device 1020 may mutually share P-data. The first external electronic device 1020 has the same account as the first electronic device 1010. For example, the electronic device 1010 may be operated as the user's host device, and the first external electronic device 1020 may be operated as the user's client device.

By so syncing, the electronic device 1010 may store a copy (Copy-B) of second personalized information (Orig-B) generated in the second container 1021 of the first external electronic device 1020 into the first container 1011. According to an embodiment of the present disclosure, the electronic device 1010 may store the generated first personalized information (Orig-A) 1015. As the sync is performed, the second container 1021 of the first external electronic device 1020 may store the generated second personalized information (Orig-B) 1025 and the copy (Copy-A) 1023 of the first personalized information as copied from the first container 1011 of the electronic device 1010.

In step 1003, the electronic device 1010 may identify access by a second external electronic device 1030 having a different account from the user account while in connection with the first external electronic device 1020 or after the communication connection with the first external electronic device 1020 is released. Upon identifying access by the second external electronic device 1030, the electronic device 1010 may perform communication connection with the second external electronic device 1030. When the communication connection is established, the electronic device 1010 may identify whether the second external electronic device 1030 has a container enabling access to the user account.

When there is no container permitting access, the electronic device 1010 may request the second external electronic device 1030 to generate a container enabling use of the user account. Thus, the second external electronic device 1030 may generate a container 1031 permitting access to the user account and may store, in the generated container 1031, a copy 1033 of personalized information (Orig-A) 1015 as copied from the electronic device 1010. The generated container 1031 may store personalized information (Orig-C) 1035 generated in the second external electronic device 1030. According to an embodiment of the present disclosure, the second external electronic device 1030 may include a container 1032, which enables access through the different account and includes personalized information (Copy-D) 1037 and (Orig-D) 1039, separately from the generated container 1031.

Figure 11:
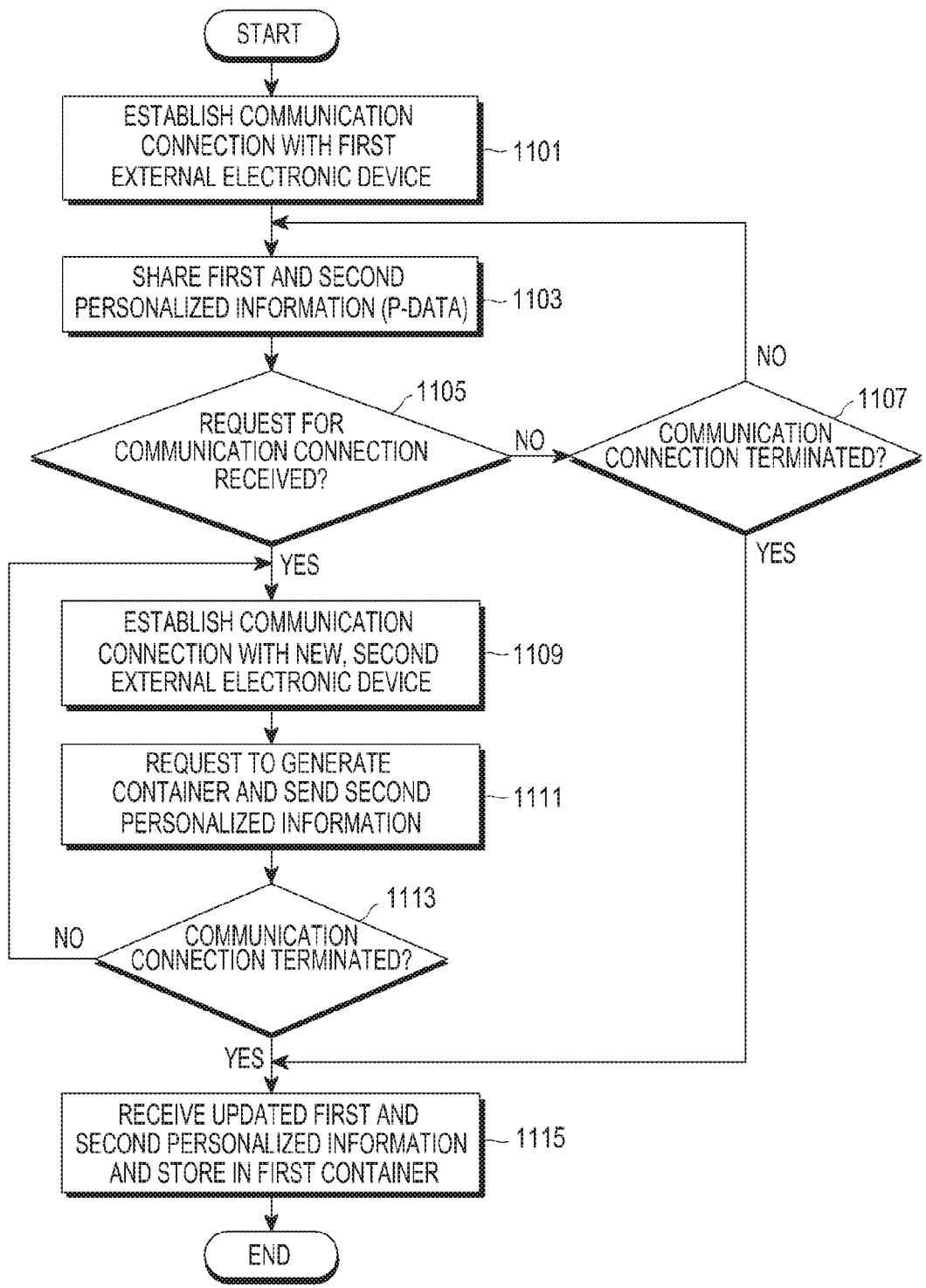
FIG. 11 illustrates a process of an electronic device according to an embodiment of the present disclosure.

FIG. 11 illustrates a process of an electronic device according to an embodiment of the present disclosure.

Referring to FIG. 11, in step 1101, the electronic device (e.g., the electronic device 1010 of FIG. 10) may establish communication connection with a first external electronic device (e.g., the electronic device 1020 of FIG. 10). In step 1103, as the communication connection with the first external electronic device is established, the electronic device may sync a first container (e.g., the first container 1011 of FIG. 10) generated in the electronic device with a second container (e.g., the second container 1021 of FIG. 10) generated in the first external electronic device and share personalized information stored in the containers.

In step 1105, upon attempting to use another external electronic device (e.g., the second external electronic device 1030 of FIG. 10) having another different account than the user account, the electronic device may identify whether there is a request for communication connection from the second external electronic device.

When the request for connecting communication from the second external electronic device is received, the electronic device performs step 1109, and when not received, the electronic device may determine in step 1107 whether communication connection with the first external electronic device is terminated. When it is determined in step 1107 that the communication connection with the first external electronic device is terminated, the electronic device may perform step 1115, and when the communication connection is determined not to be terminated, the electronic device may return to step 1103.

In step 1109, the electronic device may establish communication connection with the second external electronic device.

In step 1111, when a communication connection is established between the electronic device and the second external electronic device, the electronic device may request the second external electronic device to generate a container permitting access to the user account and send a copy of the personalized information stored in the electronic device to the second external electronic device to be stored in the generated container. Unless the second external electronic device has a container permitting access to the user account, the second external electronic device may generate a new container permitting access to the user account as per the request from the electronic device. When the second external electronic device is identified to have a container permitting access to the user account, the container of the electronic device may be synced with the identified container to share the stored personalized information.

In step 1113, the electronic device may determine whether communication connection with the second external electronic device is terminated. When it is determined that the communication connection is terminated, the electronic device may perform step 1115, and when the communication connection is not terminated, the electronic device may return to step 1109.

In step 1115, the electronic device may receive personalized information including data updated by implanting or backing up into the second external electronic device and store the received personalized information in the first container. Thus, the personalized information stored in the first container may be updated based on the personalized information including the data updated in the first or second external electronic device.

Figure 12:
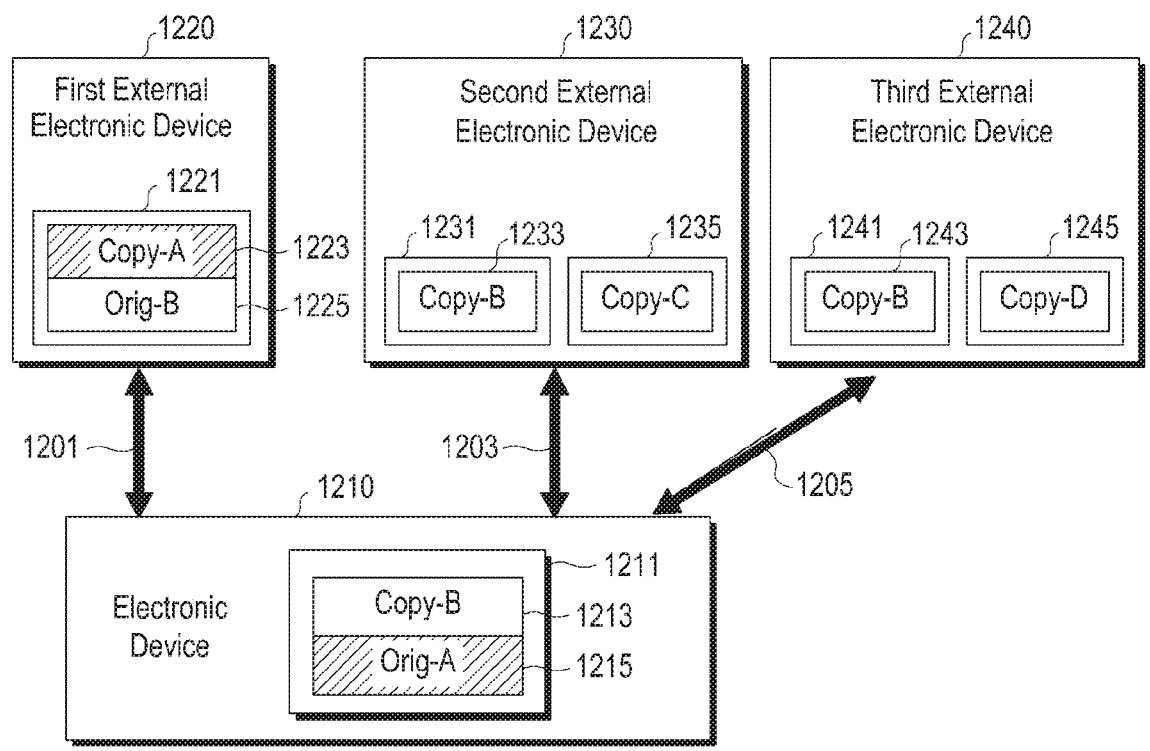
FIG. 12 illustrates a process of an electronic device according to an embodiment of the present disclosure.

FIG. 12 illustrates a process of an electronic device according to an embodiment of the present disclosure.

Referring to FIG. 12, in step 1201, an electronic device 1210 (e.g., the electronic device 101 of FIG. 1 or the electronic device 200 of FIG. 2) may perform communication connection with a first external electronic device 1220 having the same account. As the communication connection is established, the electronic device 1210 may be operated as the user's first host device, and the first external electronic device 1220 may be operated as the user's first client device.

The electronic device 1210 may sync a first container 1211 with a second container 1221 of the first external electronic device 1220 based on the user's account. In other words, the electronic device 1210 and the second external electronic device 1220, which are registered with the same account, may share pieces of P-data that they respectively generate. By so syncing, the electronic device 1210 may store a copy (Copy-B) of second personalized information (Orig-B) 1225 stored in the second container 1221 of the first external electronic device 1220 into the first container 1211. The electronic device 1210 may store first personalized information (Orig-A) 1215 generated by performing a service, application, or function into the first container 1211. As the sync is performed, the first external electronic device 1220 may store the first personalized information (Copy-A) 1223 copied from the first container 1211 of the electronic device 1210 and the personalized information 1225, in the second container 1221, by performing a service, application, or function.

In step 1203, the electronic device 1210 may identify access by an external electronic device having a different account from the user account while in communication connection with the first external electronic device 1220 or after the communication connection with the first external electronic device 1220 is terminated. Upon identifying access by the external electronic device, the electronic device 1210 may perform communication connection with the identified second external electronic device 1230, which may be a common device that is given to the user by, e.g., a logistics factory or hospital. The user may generate a container permitting access to the user account so that he/she can use the common device as if the device is his/her own.

According to an embodiment of the present disclosure, when a communication connection with the electronic device 1210 is established, the second external electronic device 1230 may receive a request for generating a container from the electronic device 1210 to generate a new container permitting access to the user account or to generate a new container by receiving a request from a user when the user applies for a container service through the server.

As the communication connection with the second external electronic device 1230 is established, the electronic device 1210 may send a copy (Copy-B) 1213 of the second personalized information to the second external electronic device 1230 to be implanted into a third container 1231 generated by the second external electronic device 1230. Hence, the second external electronic device 1230 may store a copy (Copy-B) 1233 of second personalized information obtained by recopying and implanting the copy (Copy-B) 1213 of second personalized information into the third container 1231. The second external electronic device 1230 may back up and store the first personalized information (Orig-A) 1215 stored in the first container 1211 into the third container 1231 the second external electronic device 1230 may store, in a container 1235, personalized information, such as at Copy-C copied by another account.

According to an embodiment of the present disclosure, when the user is currently using the second external electronic device 1230, the second external electronic device 1230 may provide the user with a container service through an application, service, or function retained in the third container 1231 accessible by the user, and may update, delete, or generate at least one data item of the copy 1233 of the second personalized information stored in the third container 1231, corresponding to a user input. Upon attempting to release the communication connection with the second external electronic device 1230, the electronic device 1210 may retrieve the personalized information 1233 implanted or backed up into the second external electronic device 1230 and may update the personalized information 1213 or 1215 stored in the first container 1211 based on the retrieved personalized information 1233. When the personalized information is updated after the communication connection with the electronic device 1210 is released, the second external electronic device 1230 may send the updated personalized information to the server. Accordingly, the electronic device 1210 may receive personalized information from the server to identify whether the personalized information 1233 received from the second external electronic device 1230 is the latest updated information and update the personalized information stored in the first container 1211 with the received personalized information.

According to an embodiment of the present disclosure, in step 1205, the electronic device 1210 may identify access by the third external electronic device 1240, having a different account than the user account while in communication connection with the second external electronic device 1230 or after the communication connection with the second external electronic device 1230 terminates. Upon identifying access by the third external electronic device 1240, the electronic device 1210 may perform communication connection with the identified third external electronic device 1240.

For example, after using the second external electronic device 1230, the user may receive and use the third external electronic device 1240 which is another common device having a different account than the user account. In such case, the electronic device 1210 may register the user account and the third external electronic device 1240 and then perform communication connection. The electronic device 1210 may request the third external electronic device 1240 to generate a new container. When a communication connection with the third external electronic device 1240 is established, the electronic device 1210 may generate a container permitting user access based on the user account and sync the generated container 1241 with the first container 1211 and share the stored personalized information. Such operations may be performed in a similar manner to the operational process between the electronic device 1210 and the second external electronic device 1230.

According to an embodiment of the present disclosure, the third external electronic device 1240 may sync with the container 1211 of the electronic device 1210 that stores the copy of the personalized information 1233 updated in the second external electronic device 1230 that the user has previously used. Thus, the third external electronic device 1240 may receive the personalized information last processed by the user from the electronic device 1210 and store a copy of the personalized information, such as Copy-B 1243 of the second personalized information, in the container 1241. Therefore, although the user uses a common device different from that of the second external electronic device 1230 he or she has previously used, the user may access the personalized information processed in the prior common device and continuously process the personalized information.

According to an embodiment of the present disclosure, the third external electronic device 1240 may store, in the container 1241, personalized information generated as the user uses the third external electronic device 1240 to update the copy (Copy-B) 1243 of the second personalized information. The third external electronic device 1240 may send the (Copy-B) 1243 of second personalized information updated in connection with the user account to the electronic device 1210. Hence, the electronic device 1210 may store the received second personalized information copy (Copy-B) 1243 in the container 1211 to update the second personalized information copy 1213. The third external electronic device 1240 may back up and store the first personalized information 1215 stored in the first container 1211 into the container 1241, and may store, in the container 1245, personalized information copy (Copy-D) copied by another account.

Figure 13:
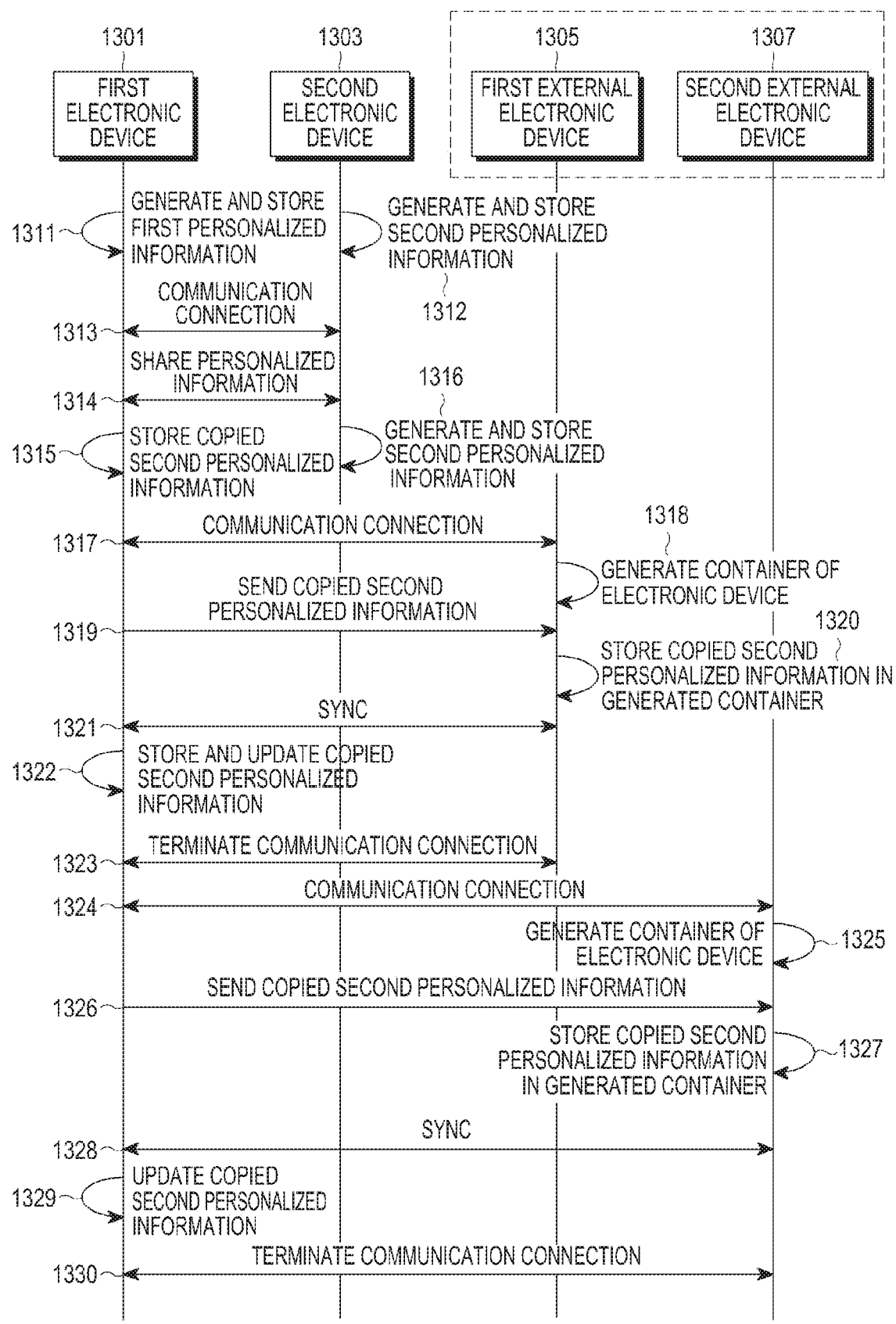
FIG. 13 illustrates a process of an electronic device according to an embodiment of the present disclosure.

FIG. 13 illustrates a process of an electronic device according to an embodiment of the present disclosure.

Referring to FIG. 13, in steps 1311 and 1312, the first electronic device 1301 (e.g., the electronic device 1210 of FIG. 12) and a second electronic device 1303 (e.g., the electronic device 1220 of FIG. 12) each may register a user account, generate a default container, and generate P-data stored in the default container, as described above in connection with FIG. 5.

In step 1313, the first electronic device 1301 may perform communication connection with the second electronic device 1303.

In step 1314, when a communication connection with the second electronic device 1303 is established, the first electronic device 1301 may sync a first container with a second container of the second electronic device 1303 and share the stored personalized information. Thus, in step 1315, the first electronic device 1301 may store the shared personalized information, i.e., the personalized information copied from the second electronic device 1303, in the first container. In step 1316, the second electronic device 1303 may store personalized information copied from the first container of the first electronic device 1301 into the second container.

According to an embodiment of the present disclosure, when the communication connection with the second electronic device 1303 terminates, the first electronic device 1301 may perform an operation for releasing the communication connection. The second electronic device 1303 may delete the personalized information copied from the first electronic device 1301 and stored in the second container. The operation of deleting the personalized information may be performed in such a manner that the user sends a delete request to a server using account information through the first electronic device in use, and the server requests the second electronic device 1303 to delete the information requested by the user to do so. Thus, the second electronic device 1303 may delete the information requested to be deleted in the second container.

In step 1317, the first electronic device 1301 may perform communication connection with a first external electronic device 1305 having a different account. In step 1318, the first external electronic device 1305 may generate a container accessible by the user account.

In step 1319, the first electronic device 1301 may send the personalized information, such as first personalized information generated in the container of the first external electronic device, copied from the first container to the first external electronic device 1305. Thus, the first external electronic device 1305 may store the copied personalized information in the generated container (third container) in step 1320. In step 1321, the first electronic device 1301 may sync with the first external electronic device 1305 connected thereto for the container to mutually share the personalized information stored. In step 1322, the first electronic device 1301 may thus receive the personalized information processed by the user on the first external electronic device 1305 to update the personalized information stored in the third container. In step 1323, as the user completes the use of the first external electronic device 1305, the communication connection between the first electronic device 1301 and the first external electronic device 1305 may terminate.

When the user receives and uses a third external electronic device 1305 which is a common device having a different account from the user account, the first electronic device 1301 may register the user account and perform communication connection with the third external electronic device 1305 in step 1324. Subsequent steps 1325 to 1330 may be performed in a similar manner to steps 1318 to 1323 described above.

The following are aspects according to embodiments of the present disclosure, as described above.

An electronic device may comprise a housing, at least one contact connected with the housing, the at least one contact configured to be coupled to a user's body or an object, at least one communication circuit, a user interface exposed at least partially through the housing, a processor in the housing, the housing electrically connected with the communication circuit and the user interface, and a non-volatile storage device electrically connected with the processor. The housing may be electrically connected with the communication circuit and the user interface.

As a method for managing data by the electronic device, the processor may establish a first communication link with a first external electronic device including a first application program supporting the first communication link using the communication circuit, at least partially sync with the first external electronic device for at least one of the user-based and account-based items using the communication circuit, disconnect the electronic device from the first external electronic device while maintaining the user- and/or account-based item s and information on data in a container included in the storage device and storing data configured of user-based and/or account-based items and information, establish a second communication link with a second external electronic device including a second application supporting the second communication link using the communication circuit when the at least one of the user-based and account-based items and the information on the data is not provided, and partially sync with the second external electronic device for at least one of the user-based and account-based items using the communication circuit.

At least one of the user-based and account-based items may include at least one user profile information item or account information item related to the user.

At least one of the user-based and account-based items may include a list of at least one installed application program by the electronic device, data related to the at least one installed application program, or a user interface setting implemented by the user to the electronic device.

As a method for managing container-based information by an electronic device, the electronic device may perform the operations of generating a first container storing first personalized information generated based on at least one of a user and an account, when a communication connection with a first external electronic device is established, transmitting the first personalized information so that the first personalized information is stored in a second container of the first external electronic device, receiving second personalized information generated by the first external electronic device based on the at least one of the user and the account and storing the second personalized information in the first container, and when a communication connection with a second external electronic device is established, transmitting the second personalized information stored in the first container so that the second personalized information stored in the first container is stored in a third container of the second external electronic device.

When the communication connection with the second external electronic device is established, the electronic device may transmit the first personalized information so that the first personalized information stored in the first container is stored in the third container.

Upon establishing a communication connection with a third external electronic device having a different account from the account registered in the electronic device, the electronic device may request the third external electronic device to generate a new container based on the at least one of the user and the account and transmit the second personalized information so that the second personalized information stored in the first container is stored in the new container.

When the communication connection with the first external electronic device is terminated, the electronic device may receive information updated in connection with the first personalized information from the first external electronic device and update the first personalized information stored in the first container based on the updated information received.

When the communication connection with the second external electronic device is terminated, the electronic device may receive information updated in connection with the second personalized information from the second external electronic device and update the second personalized information stored in the first container based on the updated information received.

When the communication connection is terminated, the first personalized information and the second personalized information stored in the third container may be removed from the second external electronic device.

FIG. 14 illustrates a configuration of personalized information of an electronic device according to an embodiment of the present disclosure.

In FIG. 14, an electronic device (e.g., the electronic device 101 of FIG. 1 or the electronic device 200 of FIG. 2) or an external electronic device (e.g., the electronic device 102 or 104 of FIG. 1) may select a container level, such as a first, second, third, or fourth level, depending on the available capacity of the memory and configure personalized information according to the selected level.

The first level Lv1 may include container information (container info) and authentication information (authentication info). The first level may be a level at which personalized information may be configured when the available memory capacity is, e.g., 1 Mbyte or less. The container information may include at least one of a type, version, privilege, or account information (account info). The authentication information may include at least one of an account identity information (account ID/password) or a pairing key.

The second level Lv2 may include environment information (environment info) and may be where personalized information may be configured when the available memory capacity is, e.g., 10 Mbytes or less. The environment information may include at least one of system setting data, application setting data, application list, or application data.

The third level Lv3 may include security information (secured/private info) and may be where personalized information may be configured when the available memory capacity is, e.g., 50 Mbytes or less. The secured/private info may include at least one of secured user data, user privacy data or user statistic data.

The fourth level Lv4 may include user information (user info) and may be where personalized information may be configured when the available memory capacity is, e.g., 100 Mbytes or less. The user information may include at least one of multimedia data, user data, or shared data.

Figure 15:
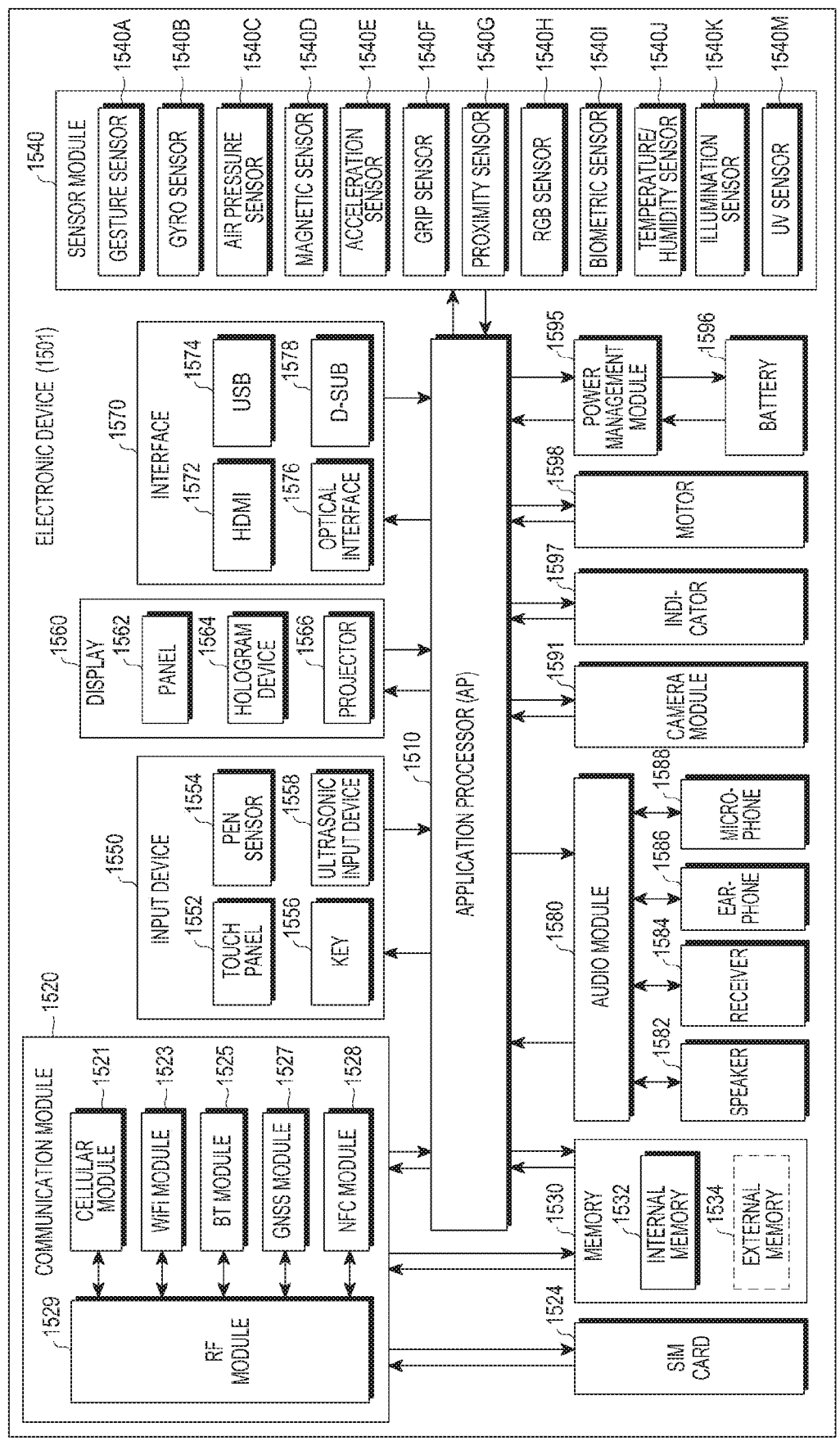
FIG. 15 illustrates an electronic device according to an embodiment of the present disclosure.

FIG. 15 illustrates an electronic device according to an embodiment of the present disclosure. The electronic device 1501 may include all or part of the configuration of, e.g., the electronic device 101 shown in FIG. 1. The electronic device 1501 may include at least one application processor (AP) 1510, a communication module 1520, a SIM card 1524, a memory 1530, a sensor module 1540, an input device 1550, a display 1560, an interface 1570, an audio module 1580, a camera module 1591, a power management module 1595, a battery 1596, an indicator 1597, and a motor 1598.

The processor 1510 may control multiple hardware and software components connected to the processor 1510 by running an operating system or application programs, and the processor 210 may process and compute various data. The processor 1510 may be implemented in a system on chip (SoC). According to an embodiment of the present disclosure, the processor 1510 may further include a graphic processing unit (GPU) and/or an image signal processor. The processor 1510 may include at least some (e.g., the cellular module 1521) of the components shown in FIG. 15, may load a command or data received from at least one of other components, such as a non-volatile memory, on a volatile memory, process the command or data, and store various data in the non-volatile memory.

The communication module 1520 may have the same or similar configuration to the communication interface 170 of FIG. 1 and thus may include a cellular module 1521, a Wi-Fi module 1523, a BT module 1525, a GNSS module 1527

(e.g., a GPS module, a Glonass module, a Beidou module, or a Galileo module), an NFC module 1528, and an RF module 1529.

The cellular module 1521 may provide voice call, video call, text, or Internet services through a communication network, may perform identification or authentication on the electronic device 1501 in the communication network using the SIM 1524 (e.g., the SIM card), and may perform at least some of the functions providable by the processor 1510. According to an embodiment of the present disclosure, the cellular module 1521 may include a communication processor (CP).

The Wi-Fi module 1523, the BT module 1525, the GNSS module 1527, or the NFC module 1528 may include a process for, e.g., processing data communicated through the module. According to an embodiment of the present disclosure, at least some (e.g., two or more) of the cellular module 1521, the Wi-Fi module 1523, the Bluetooth module 1525, the GNSS module 1527, or the NFC module 1528 may be included in a single integrated circuit (IC) or an IC package.

The RF module 1529 may communicate data, such as RF signals. The RF module 1529 may include a transceiver, a power amp module (PAM), a frequency filter, a low noise amplifier (LNA), and an antenna. According to an embodiment of the present disclosure, at least one of the cellular module 1521, the Wi-Fi module 1523, the Bluetooth module 1525, the GNSS module 1527, or the NFC module 1528 may communicate RF signals through a separate RF module.

The SIM card 1524 may include, e.g., a card including a subscriber identification module and/or an embedded SIM, and may contain unique identification information, such as an integrated circuit card identifier (ICCID, or subscriber information, such as an international mobile subscriber identity (IMSI).

The memory 1530 may include an internal memory 1532 and an external memory 1534. The internal memory 1532 may include at least one of a volatile memory, such as a dynamic random access memory (DRAM), a static RAM (SRAM), or a synchronous dynamic RAM (SDRAM), or a non-volatile memory, such as a one-time programmable read only memory (OTPROM), a programmable ROM (PROM), an erasable and programmable ROM (EPROM), an electrically erasable and programmable ROM (EEPROM), a mask ROM, a flash ROM, a flash memory, such as a NAND flash, or a NOR flash, a hard drive, or solid state drive (SSD).

The external memory 1534 may include a flash drive, e.g., a compact flash (CF) memory, a secure digital (SD) memory, a micro-SD memory, a min-SD memory, an extreme digital (xD) memory, a multi-media card (MMC), or a Memory Stick™, and may be functionally and/or physically connected with the electronic device 1501 via various interfaces.

For example, the sensor module 1540 may measure a physical quantity or detect a motion state of the electronic device 1501, and may convert the measured or detected information into an electrical signal. The sensor module 1540 may include at least one of a gesture sensor 1540A, a gyro sensor 1540B, an air pressure sensor 1540C, a magnetic sensor 1540D, an acceleration sensor 1540E, a grip sensor 1540F, a proximity sensor 1540G, a color sensor 1540H such as an red-green-blue (RGB) sensor, a biometric sensor 1540I, a temperature/humidity sensor 1540J, an illumination sensor 1540K, and an ultra violet (UV) sensor 1540M. Additionally or alternatively, the sensing module 1540 may include an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 1540 may further include a control circuit for controlling at least one of the sensors included in the sensing module.

The electronic device 1501 may further include a processor configured to control the sensor module 1540 as part of or separately from the processor 1510, and may control the sensor module 1540 while the processor 1510 is in a sleep mode.

The input unit 1550 may include a touch panel 1552, a (digital) pen sensor 1554, a key 1556, and an ultrasonic input device 1558. The touch panel 1552 may use at least one of capacitive, resistive, infrared, or ultrasonic methods, may further include a control circuit and a tactile layer that provides a user with a tactile reaction.

The (digital) pen sensor 1554 may include a part of a touch panel or a separate sheet for recognition. The key 1556 may include a physical button, optical key or key pad. The ultrasonic input device 1558 may sense an ultrasonic wave generated from an input tool through a microphone 1588 to identify data corresponding to the sensed ultrasonic wave.

The display 1560 (e.g., the display 160) may include a panel 1562, a hologram device 1564, or a projector 1566. The panel 1562 may have the same or similar configuration to the display 160 of FIG. 1, may be implemented to be flexible, transparent, or wearable, and may be incorporated with the touch panel 1552 in a module. The hologram device 1564 may project three dimensional (3D) images (holograms) in the air by using light interference. The projector 1566 may display an image by projecting light onto a screen, which may be located inside or outside of the electronic device 1501 and may further include a control circuit to control the panel 1562, the hologram device 1564, or the projector 1566.

The interface 1570 may include e.g., a high definition multimedia interface (HDMI) 1572, a USB 1574, an optical interface 1576, and a d-subminiature (D-sub) 1578. The interface 1570 may be included in e.g., the communication interface 170 shown in FIG. 1. Additionally or alternatively, the interface 1570 may include a mobile high-definition link (MHL) interface, a secure digital (SD) card/multimedia card (MMC) interface, or infrared data association (IrDA) standard interface.

The audio module 1580 may convert a sound into an electric signal or vice versa, for example. At least a part of the audio module 1580 may be included in e.g., the input/output interface 150 as shown in FIG. 1. The audio module 1580 may process sound information input or output through e.g., a speaker 1582, a receiver 1584, an earphone 1586, or the microphone 1588.

For example, the camera module 1591 may be a device for recording still images and videos, and may include, according to an embodiment of the present disclosure, one or more image sensors, such as front and back sensors, a lens, an image signal processor (ISP), or a flash such as an LED or xenon lamp.

The power manager module 1595 may manage power of the electronic device 1501, and may include a power management Integrated circuit (PMIC), a charger IC, or a battery gauge. The PMIC may have a wired and/or wireless recharging scheme. The wireless charging scheme may include a magnetic resonance scheme, a magnetic induction scheme, or an electromagnetic wave based scheme, and an additional circuit, such as a coil loop, a resonance circuit, or a rectifier may be added for wireless charging. The battery gauge may measure an amount of remaining power of the battery 1596, a voltage, a current, or a temperature while the battery 1596 is being charged. The battery 1596 may include, e.g., a rechargeable battery or a solar battery.

The indicator 1597 may indicate a particular state of the electronic device 1501 or a part (e.g., the processor 1510) of the electronic device, including e.g., a booting state, a message state, or recharging state. The motor 1598 may convert an electric signal to a mechanical vibration and may generate a vibrational or haptic effect. Although not shown, a processing unit for supporting mobile TV, such as a GPU may be included in the electronic device 1501. The processing unit for supporting mobile TV may process media data conforming to a standard for digital multimedia broadcasting (DMB), digital video broadcasting (DVB), or mediaFlo™.

Each of the aforementioned components of the electronic device may include one or more parts, and a name of the part may vary with a type of the electronic device. The electronic device in accordance with embodiments of the present disclosure may include at least one of the aforementioned components, omit some of the components, or include additional components. Some of the components may be combined into an entity, but the entity may perform the same functions as the components may do.

Figure 16:
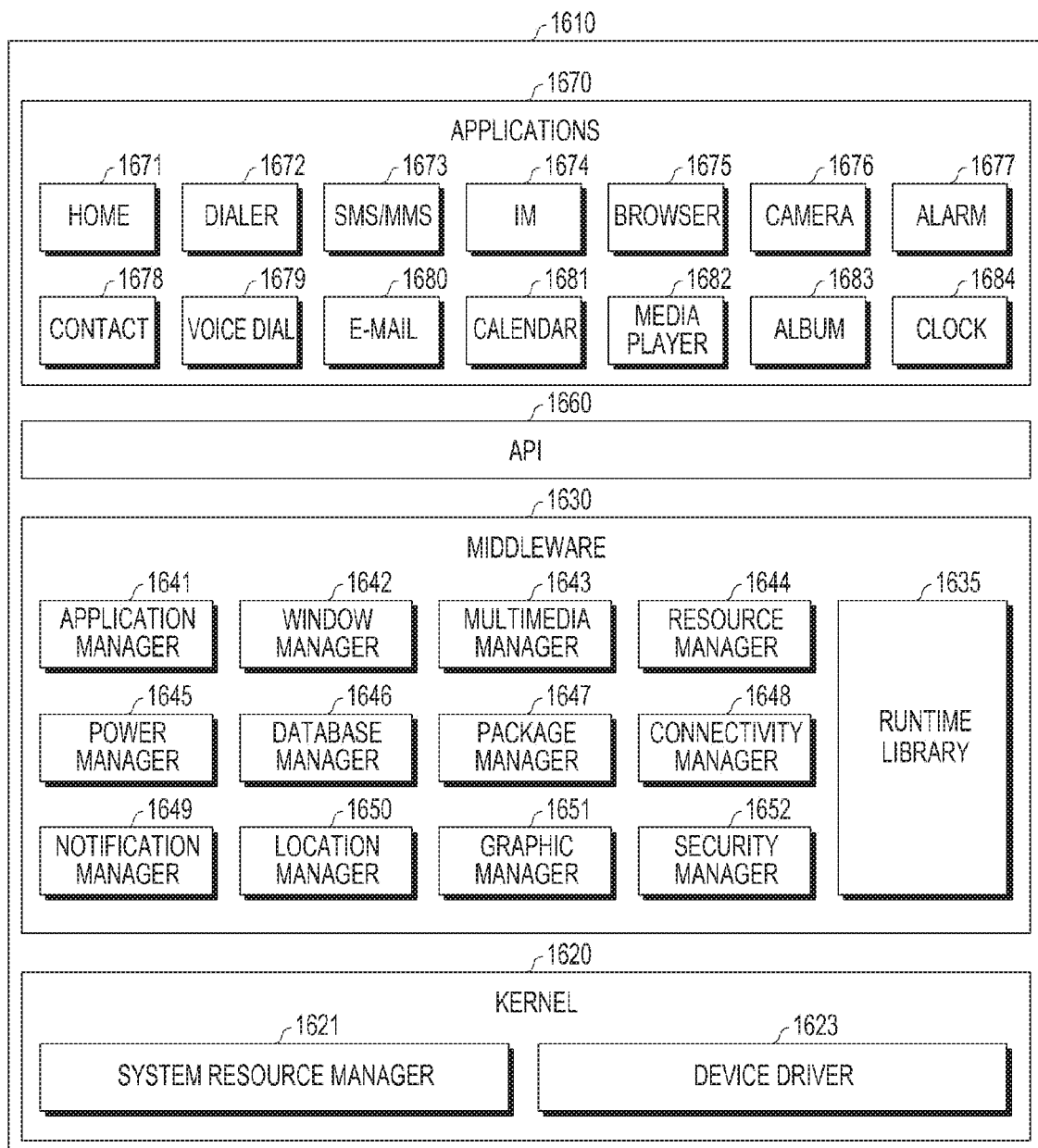
FIG. 16 illustrates a program module according to an embodiment of the present disclosure.

FIG. 16 illustrates a program module according to an embodiment of the present disclosure. The program module 1610 (e.g., the program 140) may include an OS controlling resources related to the electronic device (e.g., the electronic device 101) and/or various applications (e.g., the application processor 147) driven on the operating system, such as Android, iOS, Windows, Symbian, Tizen, or Bada.

The program 1610 may include, e.g., a kernel 1620, middleware 1630, an application programming interface (API) 1660, and/or applications 1670. At least a part of the program module 1610 may be preloaded on the electronic device or may be downloaded from an external electronic device (e.g., the electronic devices 102 and 104 or server 106).

The kernel 1620 (e.g., the kernel 141) may include a system resource manager 1621 and a device driver 1616. The system resource manager 1621 may perform control, allocation, or recovery of system resources. According to an embodiment of the present disclosure, the system resource manager 1621 may include a process managing unit, a memory managing unit, or a file system managing unit. The device driver 1623 may include, e.g., a display driver, a camera driver, a Bluetooth driver, a shared memory driver, a USB driver, a keypad driver, a Wi-Fi driver, an audio driver, or an inter-process communication (IPC) driver.

The middleware 1630 may provide various functions to the application 1670 through the API 1660 so that the application 1670 may efficiently use limited system resources in the electronic device or provide functions jointly required by applications 1670. According to an embodiment of the present disclosure, the middleware 1630 (e.g., the middleware 143) may include at least one of a runtime library 1635, an application manager 1641, a window manager 1642, a multimedia manager 1643, a resource manager 1644, a power manager 1645, a database manager 1646, a package manager 1647, a connectivity manager 1648, a notification manager 1649, a location manager 1650, a graphic manager 1651, and a security manager 1652.

The runtime library 1635 may include a library module used by a compiler in order to add a new function through a programming language while, e.g., at least one of the applications 1670 is being executed. The runtime library 1635 may perform input/output management, memory management, or operation on arithmetic functions.

The application manager 1641 may manage the life cycle of at least one of the applications 1670. The window manager 1642 may manage GUI resources used on the screen. The multimedia manager 1643 may grasp formats necessary to play various media files and use a codec appropriate for a format to perform encoding or decoding on media files. The resource manager 1644 may manage resources, such as source code of at least one of the applications 1670, memory or storage space.

The power manager 1645 may operate together with, e.g., a basic input/output system (BIOS) to manage battery or power and provide power information necessary for operating the electronic device. The database manager 1646 may generate, search, or vary a database to be used in at least one of the applications 1670. The package manager 1647 may manage installation or update of an application that is distributed in the form of a package file.

The connectivity manager 1648 may manage wireless connectivity, such as, e.g., Wi-Fi or Bluetooth. The notification manager 1649 may display or notify an event, such as a coming message, appointment, or proximity notification, of the user without interfering with the user. The location manager 1650 may manage locational information on the electronic device. The graphic manager 1651 may manage graphic effects to be offered to the user and their related user interface. The security manager 1652 may provide various security functions necessary for system security or user authentication. According to an embodiment of the present disclosure, when the electronic device (e.g., the electronic device 101) has telephony capability, the middleware 1630 may further include a telephony manager for managing voice call or video call functions of the electronic device.

The middleware 1630 may include a middleware module forming a combination of various functions of the above-described components. The middleware 1630 may provide a specified module per type of the operating system in order to provide a differentiated function. The middleware 1630 may dynamically omit some existing components or add new components.

The API 1660 (e.g., the API 145) may be a set of API programming functions and may have different configurations depending on operating systems. For example, in the case of Android or iOS, one API set may be provided per platform, and in the case of Tizen, two or more API sets may be offered per platform.

The applications 1670 (e.g., the application processor 147) may provide functions such as a home 1671, a dialer 1672, a short message service (SMS)/multimedia messaging service (MMS) 1673, an instant message (IM) 1674, a browser 1675, a camera 1676, an alarm 1677, a contact 1678, a voice dial 1679, an email 1680, a calendar 1681, a media player 1682, an album 1683, and a clock 1684 function, as well as health-care functions, such as measuring the degree of workout or blood sugar, or functions for provision of environmental information, such as air pressure, moisture, or temperature information.

According to an embodiment of the present disclosure, the applications 1670 may include an information exchanging application supporting information exchange between the electronic device (e.g., the electronic device 101) and an external electronic device (e.g., the electronic devices 102 and 104). Examples of the information exchange application may include, but are not limited to, a notification relay application for transferring specific information to the external electronic device, or a device management application for managing the external electronic device.

For example, the notification relay application may include a function for relaying notification information generated from other applications of the electronic device (e.g., the SMS/MMS application, email application, health-care application, or environmental information application) to the external electronic device (e.g., the electronic devices 102 and 104). The notification relay application may receive notification information from the external electronic device and may provide the received notification information to the user.

The device management application may perform at least some functions of the external electronic device (e.g., the electronic device 102 or 104) communicating with the electronic device, such as turning on/off the external electronic device or some components thereof, or control of brightness or resolution of the display, and the device management application may install, delete, or update an application operating in the external electronic device or a call or message service provided from the external electronic device.

According to an embodiment of the present disclosure, the applications 1670 may include an application (e.g., a health-care application of a mobile medical device) designated according to an attribute of the external electronic device (e.g., the electronic devices 102 and 104). According to an embodiment of the present disclosure, the application 1670 may include an application received from the external electronic device (e.g., the server 106 or electronic devices 102 and 104). According to an embodiment of the present disclosure, the application 1670 may include a preloaded application or a third party application downloadable from a server. The names of the components of the program module 1610 according to the shown embodiment may vary depending on the type of operating system.

According to an embodiment of the present disclosure, at least a part of the program module 1610 may be implemented in software, firmware, hardware, or in a combination of two or more thereof. At least a part of the programming module 1610 may be executed by a processor (e.g., the processor 210). At least a part of the program module 1610 may include e.g., a module, program, routine, set of instructions, or process for performing one or more functions.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of application specific integrated circuit (ASIC) chips, field programmable gate arrays (FPGAs), or programmable logic arrays (PLAs) that perform some operations, which have already been known or will be developed in the future.

According to an embodiment of the present disclosure, at least a part of the device, such as modules or their functions, or operations, may be implemented as instructions stored in a computer-readable storage medium e.g., in the form of a program module. The instructions, when executed by a processor (e.g., the processor 120), may enable the processor to carry out a corresponding function. The computer-readable storage medium may be e.g., the memory 130.

The computer-readable storage medium may include a hardware device, such as hard discs, floppy discs, and magnetic tape, optical media such as compact disc ROMs (CD-ROMs) and digital versatile discs (DVDs), magneto-optical media such as floptical disks, ROMs, RAMs, flash memories, and/or the like. Examples of the program instructions may include not only machine language codes but also high-level language codes which are executable by various computing means using an interpreter. The aforementioned hardware devices may be configured to operate as one or more software modules to carry out embodiments of the present disclosure, and vice versa.

Modules or programming modules in accordance with embodiments of the present disclosure may include at least one of the aforementioned components, omit some of them, or further include other additional components. Operations performed by modules, programming modules or other components in accordance with embodiments of the present disclosure may be performed sequentially, simultaneously, repeatedly, or heuristically. Some of the operations may be performed in a different order, or omitted, or include other additional operation(s).

According to an embodiment of the present disclosure, there may be provided a computer-readable recording medium recording a program to be run on a computer, the program retaining commands executed by a processor to enable the processor to generate a first container storing first personalized information generated based on at least one of a user and an account, when a communication connection with a first external electronic device is established, transmit the first personalized information so that the first personalized information is stored in a second container of the first external electronic device, receive second personalized information generated by the first external electronic device based on the at least one of the user and the account and store the second personalized information in the first container, and when a communication connection with a second external electronic device is established, transmit the second personalized information stored in the first container so that the second personalized information stored in the first container is stored in a third container of the second external electronic device.

The embodiments disclosed herein are disclosed for description and understanding of the disclosed technology and do not limit the scope of the present disclosure. Accordingly, the scope of the present disclosure should be interpreted as including all changes or embodiments based on the technical spirit of the present disclosure.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. An electronic device, comprising:
a memory including a first container storing first personalized information generated based on at least one of a user or an account;
a communication module; and
a processor configured to:
control the communication module to establish a communication connection with a first external electronic device,
control the communication module to transmit the first personalized information to a second container of the first external electronic device, obtain, from the first external electronic device, second personalized information generated by the first external electronic device based on the at least one of the user or the account, store the second personalized information in the first container, in response to a request to terminate the communication connection with the first external electronic device, receive updated information of the first personalized information from the first external electronic device via the communication connection with the first external electronic device, when the communication connection with the first external electronic device is terminated, update the first personalized information stored in the first container based on the updated information of the first personalized information received from the first external electronic device upon the termination of the communication connection, and when a communication connection with a second external electronic device is established, control the communication module to transmit the second personalized information stored in the first container to a third container of the second external electronic device.

2. The electronic device of claim 1, wherein, when the communication connection with the second external electronic device is established, the processor is configured to control the communication module to transmit the first personalized information stored in the first container to the third container of the second external electronic device.

3. The electronic device of claim 1, wherein the processor is further configured to:

control the communication module to establish a communication connection with a third external electronic device having a different account from the account registered in the electronic device, request the third external electronic device to generate a new container based on the at least one of the user and the account, and control the communication module to transmit the second personalized information stored in the first container to the new container of the third external electronic device.

4. The electronic device of claim 1, wherein the processor is further configured to:

when the communication connection with the first external electronic device is established, perform container synchronization of the first container and the second container of the first external electronic device based on the account, and when a communication connection with the second external electronic device is established, perform container synchronization of the first container and the third container of the second external electronic device based on the account.

5. The electronic device of claim 1, wherein the processor is further configured to:

in response to a request to terminate the communication connection with the second external electronic device, receive information updated in connection with the second personalized information from the second external electronic device via the communication connection with the second external electronic device, and update the second personalized information stored in the first container based on the updated information received.

6. The electronic device of claim 1, wherein, when the communication connection with the second external electronic device is terminated, the first personalized information and the second personalized information stored in the third container are removed from the third container of the second external electronic device.

7. The electronic device of claim 1, wherein the processor is further configured to:

perform authentication based on the account and a password set upon accessing the second container of the first external electronic device, and when there is additional authentication set by a user, perform the additional authentication.

8. A method for managing container-based information by an electronic device, the method comprising:

generating a first container storing first personalized information generated based on at least one of a user or an account;

controlling a communication module of the electronic device to establish a communication connection with a first external electronic device, controlling the communication module to transmit, to the first external electronic device, the first personalized information to a second container of the first external electronic device;

obtaining, from the first external electronic device, second personalized information generated by the first external electronic device based on the at least one of the user or the account;

storing the second personalized information in the first container;

in response to a request to terminate the communication connection with the first external electronic device, receiving updated information of the first personalized information from the first external electronic device via the communication connection with the first external electronic device;

when the communication connection with the first external electronic device is terminated, updating the first personalized information stored in the first container based on the updated information of the first personalized information received from the first external electronic device upon the termination of the communication connection; and when a communication connection with a second external electronic device is established, controlling the communication module to transmit the second external electronic device, the second personalized information stored in the first container to a third container of the second external electronic device.

9. The method of claim 8, further comprising, when the communication connection with the second external electronic device is established, controlling the communication module to transmit the first personalized information stored in the first container to the third container of the second external electronic device.

10. The method of claim 8, further comprising:

controlling the communication module to establish a communication connection with a third external electronic device having a different account from the account registered in the electronic device, requesting the third external electronic device to generate a new container based on the at least one of the user and the account; and controlling the communication module to transmit the second personalized information stored in the first container to the new container of the third external electronic device.

11. The method of claim 8, further comprising:
when the communication connection with the first external electronic device is established, performing container synchronization of the first container and the second container of the first external electronic device based on the account; and
when a communication connection with the second external electronic device is established, performing container synchronization of the first container and the third container of the second external electronic device based on the account.

12. The method of claim 8, further comprising:
in response to a request to terminate the communication connection with the second external electronic device, receiving information updated in connection with the second personalized information from the second external electronic device via the communication connection with the second external electronic device; and
updating the second personalized information stored in the first container based on the updated information received.

13. The method of claim 8, wherein, when the communication connection with the second external electronic device is terminated, the first personalized information and the second personalized information stored in the third container are removed from the third container of the second external electronic device.

14. A non-transitory computer-readable recording medium recording a program running on a computer, the program including executable commands executed by a processor to enable the processor to:

generate a first container storing first personalized information generated based on at least one of a user or an account,
control a communication module of the electronic device to establish a communication connection with a first external electronic device,
control the communication module to transmit, to the first external electronic device, the first personalized information to a second container of the first external electronic device,
obtain, from the first external electronic device, second personalized information generated by the first external electronic device based on the at least one of the user or the account,
store the second personalized information in the first container,
in response to a request to terminate the communication connection with the first external electronic device, receive updated information of the first personalized information from the first external electronic device via the communication connection with the first external electronic device,
when the communication connection with the first external electronic device is terminated, update the first personalized information stored in the first container based on the updated information of the first personalized information received from the first external electronic device upon the termination of the communication connection, and
when a communication connection with a second external electronic device is established, control the communication module to transmit the second personalized information stored in the first container to a third container of the second external electronic device.

* * * * *